US012143763B2

(12) United States Patent
Zhang et al.

(10) Patent No.: US 12,143,763 B2
(45) Date of Patent: Nov. 12, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/406,195

(22) Filed: Jan. 7, 2024

(65) Prior Publication Data

US 2024/0147116 A1 May 2, 2024

Related U.S. Application Data

(63) Continuation of application No. 18/451,138, filed on Aug. 17, 2023, now Pat. No. 11,895,454, which is a (Continued)

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 1/10* (2006.01)

(52) U.S. Cl.
CPC ................................. *H04R 1/1016* (2013.01)

(58) Field of Classification Search
CPC ..................................................... H04R 1/1016
See application file for complete search history.

(56) References Cited

U.S. PATENT DOCUMENTS 5,459,290 A 10/1995 Yamagishi
10,154,334 B1 12/2018 Lin et al.
(Continued)

FOREIGN PATENT DOCUMENTS

CN 212909891 U 4/2021
CN 113573215 A 10/2021
(Continued)

OTHER PUBLICATIONS

International Search Report in PCT/CN2023/083535 mailed on Jul. 13, 2023, 7 pages.
(Continued)

*Primary Examiner* — Simon King
(74) *Attorney, Agent, or Firm* — METIS IP LLC

(57) ABSTRACT

The present disclosure relates to acoustic technology, in particular to an earphone including a sound generation portion. The sound generation portion includes a transducer and a housing for accommodating the transducer. The earphone further includes an earhook. The earhook includes a first portion and a second portion. The first portion may be hung between an auricle and the head of a user, and the second portion may be connected to the first portion, extends toward an anterolateral side of the auricle, and may be connected to the sound generation portion. The sound generation portion may be fixed near an ear canal without blocking an opening of the ear canal. In at least one frequency range, when an input current of the transducer does not exceed 35.3 mA, a maximum sound pressure that the sound generation portion is able to provide to the ear canal may not be smaller than 75 dB.

20 Claims, 11 Drawing Sheets

Related U.S. Application Data continuation of application No. PCT/CN2023/083535, filed on Mar. 24, 2023.

(56) References Cited

U.S. PATENT DOCUMENTS

| | | | | |
|---|---|---|---|---|
| 11,140,469 | B1 | 10/2021 | Miller et al. | |
| 2005/0105718 | A1 | 5/2005 | Hansen et al. | |
| 2005/0141730 | A1 | 6/2005 | Murphy | |
| 2007/0009133 | A1 | 1/2007 | Gerkinsmeyer | |
| 2020/0196062 | A1 | 6/2020 | Zhang | |
| 2021/0006909 | A1 | 1/2021 | Olah et al. | |
| 2021/0006913 | A1 | 1/2021 | Olah et al. | |
| 2021/0168489 | A1* | 6/2021 | Zhang | H04R 1/1075 |
| 2022/0167097 | A1* | 5/2022 | Piechowiak | H04R 25/552 |
| 2023/0061686 | A1* | 3/2023 | Wolfl | H04R 1/2853 |

FOREIGN PATENT DOCUMENTS

| | | | |
|---|---|---|---|
| CN | 215818549 | U | 2/2022 |
| CN | 114286228 | A | 4/2022 |
| CN | 114554339 | A | 5/2022 |
| CN | 115175069 | A | 10/2022 |
| CN | 217643682 | U | 10/2022 |
| WO | 2022111485 | A1 | 6/2022 |

OTHER PUBLICATIONS

Written Opinion in PCT/CN2023/083535 mailed on Jul. 13, 2023, 7 pages.

* cited by examiner

FIG. 6
610
Sound pressure level (SPL) / dB
80
70
60
50
40
30
20
10
0
10
100
1000
10000
Frequency/Hz
-1 level
-2 level
-3 level
-4 level
-5 level
-6 level
-7 level

EARPHONES

CROSS-REFERENCE TO RELATED APPLICATIONS

This application is a continuation of U.S. application Ser. No. 18/451,138, filed on Aug. 17, 2023, which is a Continuation of International Patent Application No. PCT/CN2023/083535, filed on Mar. 24, 2023, which claims priority of Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022, the contents of each of which are entirely incorporated herein by reference.

TECHNICAL FIELD

The present disclosure relates to the field of acoustic technology, in particular to an earphone.

BACKGROUND

With the development of acoustic output technology, an acoustic output device (e.g., an earphone) has been widely used in people's daily life. The acoustic output device can be used with electronic devices, such as a mobile phone, a computer, etc., to provide a user with an auditory feast. An acoustic device may generally be classified into head-mounted type, ear-hook type, and in-ear type according to ways the user wears the acoustic device. An output performance of an acoustic device may have a great influence on user experience.

Therefore, it is necessary to provide an earphone to improve the output performance of the acoustic output device.

SUMMARY

One of the embodiments of the present disclosure provides an earphone, including: a sound generation portion, including a transducer and a housing for accommodating the transducer; an earhook including a first portion and a second portion. The first portion may be hung between an auricle and the head of a user. The second portion may be connected to the first portion, extend toward an anterolateral side of the auricle, and may be connected to the sound generation portion. The sound generation portion may be fixed near an ear canal without blocking an opening of the ear canal, and in at least one frequency range, when an input voltage of the transducer does not exceed 0.6V, a maximum sound pressure that the sound generation portion is able to provide to the ear canal may not be small than 75 dB.

One of the embodiments of the present disclosure provides an earphone including: a sound generation portion, including a transducer and a housing for accommodating the transducer; and an earhook including a first portion and a second portion. The first portion may be hung between an auricle and the head of a user, the second portion may be connected to the first portion, extend toward an anterolateral side of the auricle, and may be connected to the sound generation portion. The sound generation portion may be fixed near an ear canal without blocking an opening of the ear canal, and in at least one frequency range, when an input current of the transducer does not exceed 35.3 mA, a maximum sound pressure that the sound generation portion is able to provide to the ear canal may not be small than 75 dB.

One of the embodiments of the present disclosure provides an earphone including: a sound generation portion, including a transducer and a housing for accommodating the transducer; and an earhook including a first portion and a second portion. The first portion may be hung between an auricle and the head of a user, the second portion may be connected to the first portion, extend toward an anterolateral side of the auricle, and may be connected to the sound generation portion. The sound generation portion may be fixed near an ear canal without blocking an opening of the ear canal, and in at least one frequency range, when an input power of the transducer does not exceed 21.1 mW, a maximum sound pressure that the sound generation portion is able to provide to the ear canal may not be small than 75 dB.

One of the embodiments of the present disclosure provides an earphone including: a sound generation portion, including a transducer and a housing for accommodating the transducer; and an earhook including a first portion and a second portion. The first portion may be hung between an auricle and the head of a user, the second portion may be connected to the first portion, extend toward an anterolateral side of the auricle, and may be connected to the sound generation portion. The sound generation portion may be fixed near an ear canal without blocking an opening of the ear canal, and in at least one frequency range, a sound generation efficiency of the sound generation portion may not be small than 100 dB/V. The sound generation efficiency of the sound generation portion may be a ratio of the sound pressure provided by the sound generation portion to the ear canal to an input voltage of the transducer.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
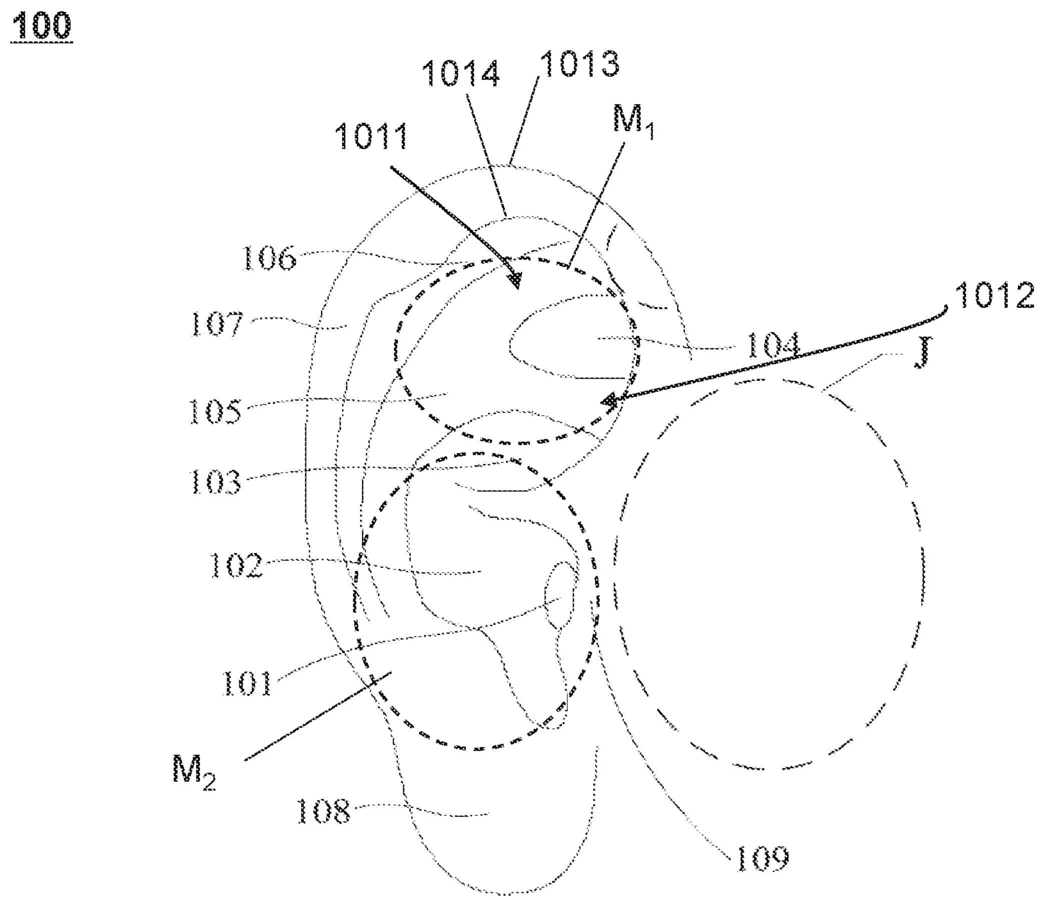
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those ordinary skilled in the art, without further creative efforts, may apply the present disclosure to other similar scenarios according to these drawings. Unless obviously obtained from the context or the context illustrates otherwise, the same numeral in the drawings refers to the same structure or operation.

FIG. 1 is a schematic diagram illustrating an exemplary ear according to some embodiments of the present disclosure. Referring to FIG. 1, an ear 100 may include an external ear canal 101, a concha cavity 102, a cymba conchae 103, a triangular fossa 104, an antihelix 105, a scapha 106, a helix 107, an earlobe 108, a crus of helix 109, an outer contour 1013, and an inner contour 1014. It should be noted that, for a convenience of description, an upper antihelix crus 1011, a lower antihelix crus 1012, and the antihelix 105 may be collectively referred to as an antihelix area in the embodiment of the present disclosure. In some embodiments, an acoustic device may be stably worn by means of one or more portions of the ear 100 supporting the acoustic device. In some embodiments, the external ear canal 101, the concha cavity 102, the cymba concha 103, the triangular fossa 104, and other portions may have a certain depth and volume in a three-dimensional (3D) space, which may be used to implement wearing needs of the acoustic device. For example, the acoustic device (e.g., an earphone) may be worn in the external ear canal 101. In some embodiments, the wearing of the acoustic device may be implemented using other portions of the ear 100 other than the external ear canal 101. For example, the acoustic device may be worn through the cymba conchae 103, the triangular fossa 104, the antihelix 105, the scapha 106, the helix 107, or a combination thereof. In some embodiments, in order to improve a wearing comfort and reliability of the acoustic device, the earlobe 108 or other portions of a user may be further used. By using other portions of the ear 100 other than the external ear canal 101 to realize the wearing of the acoustic device and a transmission of a sound, the user's external ear canal 101 may be "liberated". When the user wears the acoustic device (the earphone), the acoustic device may not block the user's external ear canal 101, and the user may receive both the sound from the acoustic device and the sound from the environment (e.g., a whistle sound, a car bell, a surrounding voice, a traffic command sound, etc.), so as to reduce a probability of traffic accidents. In some embodiments, according to a structure of the ear 100, the acoustic device may be designed into a structure adapted to the ear 100, so as to realize the wearing of a sound generation portion of the acoustic device at different positions of the ear. For example, when the acoustic device is the earphone, the earphone may include a suspension structure (e.g., an earhook) and the sound generation portion. The sound generation portion may be physically connected to the suspension structure, and the suspension structure may match a shape of the auricle, so that an entire or partial structure of the sound generation portion may be placed on a front side of the helix crus 109 (e.g., the area J enclosed by the dotted line in FIG. 1). As another example, when the user wears the earphone, the entire or partial structure of the sound generation portion may contact an upper portion of the external ear canal 101 (e.g., one or more of the crus of helix 109, the cymba conchae 103, the triangular fossa 104, the antihelix 105, the scapha 106, the helix 107, etc.). As another example, when the user wears the earphone, the entire or partial structure of the sound generation portion may be located in a cavity (e.g., an area M1 at least including the cymba conchae 103 and the triangular fossa 104 and an area M2 at least including the concha cavity 102 enclosed by the dotted line in FIG. 1) formed by one or more portions of the ear (e.g., the concha cavity 102, the cymba conchae 103, the triangular fossa 104, etc.).

Different users may have individual differences, resulting in different shapes, sizes and other dimensional differences in the ears. For the convenience of description and understanding, unless otherwise specified, the present disclosure mainly provides descriptions with reference to an ear model with a "standard" shape and size, and further describes wearing modes of the acoustic device in different embodiments on the ear model. For example, a simulator containing a head and the (left and right) ear based on ANSI: S3.36, S3.25 and IEC: 60318-7 standards, such as a GRAS KEMAR, a HEAD Acoustics, a B&K 4128 series or a B&K 5128 series, may be taken as a reference for wearing the acoustic device to present a situation that most users normally wear the acoustic device. Taking GRAS KEMAR as an example, the ear simulator may be any one of a GRAS 45AC, a GRAS 45BC, a GRAS 45CC, or a GRAS 43AG. Taking the HEAD Acoustics as an example, the ear simulator may be any one of an HMS 11.3, an HMS 11.3 LN, or an HMS 11.3LN HEC. It should be noted that a range of data measured in the embodiments of the present disclosure is based on a GRAS 45BC KEMAR, but it should be understood that there may be differences between different head models and ear models. There may be a ±10% fluctuation in a related data range. The projection of the auricle on a sagittal plane refers to a projection of an edge of the auricle on the sagittal plane. The edge of the auricle is at least composed of an outer contour of the helix, a contour of the earlobe, a tragus contour, an intertragic notch, a tragus tip, and a tragus notch, etc. Therefore, in the present disclosure, descriptions such as "wearing by the user", "in the wearing state", and "under the wearing state" may refer to that the acoustic device described in the present disclosure is worn on the ear of the aforementioned simulator. Of course, considering the individual differences of different users, structures, shapes, sizes, thicknesses, etc. of one or more portions of the ear 100 may be differentiated in design according to ears with different shapes and sizes. These differentiated designs may be expressed as feature parameters of one or more portions of the acoustic device (e.g., the sound generation portion, the earhook, etc. hereinafter). The feature parameters may have values in different ranges, so as to adapt to different ears.

It should be noted that in the fields of medicine and anatomy, three basic planes, namely a sagittal plane, a coronal plane, and a horizontal plane as well as three basic axes, namely a sagittal axis, a coronal axis, and a vertical axis may be used to define a human body. The sagittal plane refers to a section perpendicular to the ground along a front and rear direction of the body, which divides the human body into left and right portions. The coronal plane refers to a section perpendicular to the ground along a left and right direction of the body, which divides the human body into front and rear portions. The horizontal plane refers to a section parallel to the ground along a direction perpendicular to an up and down direction of the body, which divides the human body into upper and lower portions. Correspondingly, the sagittal axis refers to an axis along the front and rear direction of the body and perpendicular to the coronal plane, the coronal axis refers to the axis along the left and right direction of the body and perpendicular to the sagittal plane, and the vertical axis refers to the axis along the up and down direction of the body and perpendicular to the horizontal plane. Further, the front side of the ear in the present disclosure refers to a side of the ear facing a facial area of the human body along the sagittal axis direction. Observing the ear of the above-mentioned simulator along the direction of the coronal axis of the human body, a schematic diagram illustrating a front profile of the ear as shown in FIG. 1 may be obtained.

The above descriptions of the ear 100 are merely provided for the purposes of illustration, and are not intended to limit the scope of the present disclosure. Those skilled in the art may make various changes and modifications based on the description of the present disclosure. For example, the portion of the structure of the acoustic device may cover the portion or whole of the external ear canal 101. These changes and modifications are still within the protection scope of the present disclosure.

Figure 2:
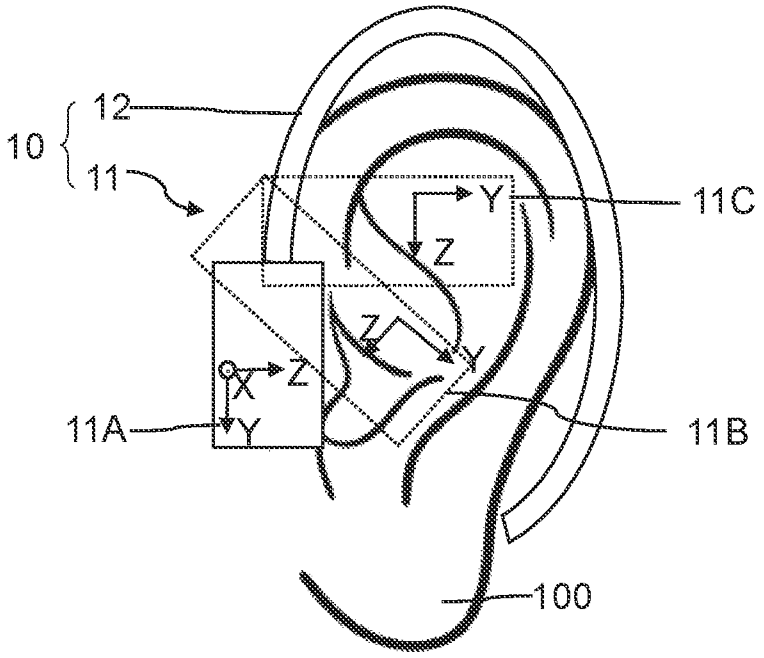
FIG. 2 is a schematic diagram illustrating an exemplary wearing of an earphone according to some embodiments of the present disclosure.

FIG. 2 is a schematic diagram illustrating an exemplary wearing of an earphone according to some embodiments of the present disclosure. As shown in FIG. 2, an earphone 10 may include a sound generation portion 11 and a suspension structure 12. In some embodiments, the sound generation portion 11 of the earphone 10 may be worn on a user's body (e.g., a head, a neck, or an upper torso, of a human body) through the suspension structure 12. In some embodiments, the suspension structure 12 may be an earhook, the sound generation portion 11 may be connected to one end of the earhook, and the earhook may be set in a shape that matches a user's ear. For example, the earhook may be an arc shape structure. In some embodiments, the suspension structure 12 may also be a clamping structure adapted to a user's auricle, so that the suspension structure 12 may be clamped at the user's auricle. In some embodiments, the suspension structure 12 may include but be not limited to the earhook, the elastic band, etc., so that the earphone 10 may be better hung on the user's body and prevent a fall-off when the earphone 10 is used by the user.

In some embodiments, the sound generation portion 11 may be worn on the user's body, and a transducer may be provided in the sound generation portion 11 to generate a sound input to the user's ear 100. In some embodiments, the earphone 10 may be combined with products such as glasses, headsets, head-mounted display devices, augmented reality (AR)/virtual reality (VR) helmets, etc. In this case, the sound generation portion 11 may be worn near the user's ear 100 in a hanging or clipping manner. In some embodiments, the sound generation portion 11 may be circular, elliptical, polygonal (regular or irregular), U-shaped, V-shaped, semicircular, so that the sounding portion 11 may be directly attached to the user's ear 100.

In some embodiments, the sound generation portion 11 and the suspension structure 12 may be detachable structures. The sound generation portion 11 and the suspension structure 12 may be connected by various collection ways such as a clamping collection, a welding collection, a glue connection, a threaded connection, a screw connection, etc. The sound generation portion 11 and the suspension structure 12 may be also connected through a connection structure (e.g., an adapter housing). Under the aforementioned design, the sound generation portion 11 may be separated from the suspension structure 12 or the connection structure, and the sound generation portion 11 may be measured to obtain data such as a size or a volume.

In some embodiments, the housing of the sound generation portion 11 may be integrally formed with the suspension structure 12. As the suspension structure 12 is used to wear the sound generation portion 11 on the user, the suspension structure 12 and an inner side of a housing of the sound generation portion 11 (e.g., the inner side IS in FIG. 3B) may not be in the same plane. Therefore, a section obtained through cutting the integrated structure by the plane where the inner side of the housing of the sound generation portion 11 (e.g., the inner side IS in FIG. 13B) may be taken as a separation position between the sound generation portion 11 and the suspension structure 12, and a section obtained through cutting the integrated structure by the plane where an upper side of the housing of the sound generation portion 11 (e.g., the upper side US in FIG. 13B) may be taken as another separation position between the sound generation portion 11 and the suspension structure 12. Based on the above two separation positions, the sound generation portion 11 and the suspension structure 12 may be distinguished to further perform operations such as a measurement.

Combining FIG. 1 and FIG. 2, in some embodiments, when the user wears the earphone 10, at least a portion of the sound generation portion 11 may be located in an area J on the front side of the tragus, or areas M1 and M2 on the anterolateral side of the auricle, of the ear 100 of the user shown in FIG. 1. An exemplary description will be given below in conjunction with different wearing positions (e.g., 11A, 11B, or 11C) of the sound generation portion 11. It should be noted that the anterolateral side of the auricle mentioned in the embodiments of the present disclosure refers to a side of the auricle away from the head along a coronal axis, and correspondingly, a posterior medial side of the auricle refers to the side of the auricle facing the head along the coronal axis. In some embodiments, the sound generation portion 11A may be located on the side of the user's ear 100 facing the facial area along the sagittal axis, that is, the sound generation portion 11A may be located on the human facial area J on the front side of the ear 100. Further, a transducer may be provided inside the housing of the sound generation portion 11A, and at least one sound hole (not shown in FIG. 2) may be provided on the housing of the sound generation portion 11A, and the sound hole may be located on the side wall of the housing of the sound generation portion facing or close to the user's external ear canal 101. The transducer may output sound to the user's external ear canal 101 through the at least one sound hole. In some embodiments, the transducer may include a diaphragm, and a cavity inside the housing of the sound generation portion 11 may be at least divided into a front cavity and a rear cavity by the diaphragm. The at least one sound hole may be acoustically coupled with the front cavity, and a vibration of the diaphragm drives the air in the front cavity to vibrate to generate an air conduction sound. The air conduction sound generated in the front cavity may be transmitted to the outside through the at least one sound hole. In some embodiments, the housing of the sound generation portion 11 may also include one or more pressure relief holes. The pressure relief hole may be located on the side wall of the housing adjacent to or opposite to the side wall where the at least one sound hole is located. The one or more pressure relief holes may be acoustically coupled with the rear cavity. When the diaphragm vibrates, the air in the rear cavity may be driven to vibrate to generate the air conduction sound. The air conduction sound generated by the rear cavity may be transmitted to the outside through the one or more pressure relief holes. Exemplarily, in some embodiments, the transducer in the sound generation portion 11A may output sound with a phase difference (e.g., an opposite phase) through the at least one sound hole and the one or more pressure relief holes, and the at least one sound hole may be located on the side wall of the housing of the sound generation portion 11A away from the user's external ear canal. The one or more pressure relief holes may be located on the side of the housing of the sound generation portion 11 away from the user's external ear canal 101. At this time, the housing may be used as a baffle to increase a sound path difference between a sound path from the at least one sound hole to the external ear canal 101 and a sound path from the one or more pressure relief holes to the external ear canal 101, thereby increasing a sound intensity at the external ear canal 101 while reducing a sound volume of far-field sound leakage. In some embodiments, the sound generation portion 11 may have a long axis direction Y and a short axis direction Z perpendicular to a thickness direction X, and the long axis direction Y and the short axis direction Z may be orthogonal to each other. The long-axis direction Y may be defined as a direction with a greatest extension size of a shape of a two-dimensional projection of the sound generation portion 11 (e.g., a projection of the sound generation portion 11 on the plane where its outer surface is located, or a projection of the sound generation portion 11 on the sagittal plane). For example, when a projected shape is rectangular or approximately rectangular, the long axis direction may be a length direction of the rectangle or the approximate rectangle. The short axis direction Z may be defined as a direction perpendicular to the long axis direction Y in a projected shape of the sound generation portion 11 on the sagittal plane. For example, when the projected shape is a rectangle or an approximate rectangle, the short axis direction may be a width direction of the rectangle or the approximate rectangle. The thickness direction X may be defined as a direction perpendicular to the two-dimensional projection, for example, the thickness direction X may be consistent with the direction of the coronal axis, and both point to the left and right directions of the body. In some embodiments, when the sound generation portion 11 is in an inclined state when worn, the long axis direction Y and the short axis direction Z may still be parallel or approximately parallel to the sagittal plane, and the long axis direction Y and the sagittal axis direction may have a certain included angle. That is, the direction of the long axis Y may also be inclined accordingly, and the direction of the short axis Z may have a certain included angle with a direction of the vertical axis, that is, the direction of the short axis Z may also be set inclined. As shown in FIG. 2, in some embodiments, a whole or portion of the structure of the sound generation portion 11B may extend into the concha cavity, that is, the projection of the sound generation portion 11B on the sagittal plane and the projection of the concha cavity on the sagittal plane may have an overlapping portion. More descriptions regarding the sound generation portion 11B may be found elsewhere in the present disclosure, for example, FIG. 3A and the description thereof. In some embodiments, the sound generation portion 11 (e.g., the sound generation portion 11C shown in FIG. 2) may also be in a horizontal or approximately horizontal state in the wearing state. The long axis direction Y may be consistent or approximately consistent with the sagittal axis direction, which both point to the front and rear directions of the body. The short axis direction Z may be consistent or approximately consistent with the direction of the vertical axis, which both point to the up and down directions of the body. It should be noted that in the wearing state, the sound generation portion 11C being in an approximately horizontal state may indicate that an included angle between the long axis direction Y and the sagittal axis of the sound generation portion 11C shown in FIG. 2 may be within a specific range (e.g., not greater than 20°). In addition, the wearing position of the sound generation portion 11 is not limited to the sound generation portion 11A, the sound generation portion 11B, and the sound generation portion 11C shown in FIG. 2, as long as the wearing position satisfies the area J, the area M1, and the area M2 shown in FIG. 1. For example, an entire or partial structure of the sound generation portion 11 may be located in the area J enclosed by the dotted line in FIG. 1. As another example, the entire or partial structure of the sound generation portion may be in contact with one or more portions of the ear 100 such as the crus of helix 109, the cymba conchae 103, the triangular fossa 104, the antihelix 105, the scapha 106, the helix 107, etc. As another example, the entire or partial structure of the sound generation portion 11 may be located in a cavity (e.g., the area M1 at least including the cymba conchae 103 and the triangular fossa 104, and the area M2 at least including the concha cavity 102, enclosed by the dotted line as shown in FIG. 1) formed by one or more portions of the ear 100 (e.g., the concha cavity 102, the cymba conchae 103, the triangular fossa 104, etc.).

In order to improve a stability of the earphone 10 in the wearing state, the earphone 10 may adopt any one or a combination of the following modes. First, at least portion of the suspension structure 12 may be configured as a profiling structure that fits at least one of the posterior medial side of the auricle and the head, so as to increase a contact area between the suspension structure 12 and the ear and/or the head, thereby increasing a resistance of the acoustic device from falling off the ear. Second, at least portion of the suspension structure 12 may be configured as an elastic structure, so that the suspension structure 12 may have a certain deformation in the wearing state, so as to increase a positive pressure of the suspension structure 12 on the ear and/or head, thereby increasing the resistance of the acoustic device from falling off the ear. Third, the suspension structure 12 may be at least partially configured to abut against the ear and/or the head in the wearing state. In this way, the suspension structure 12 may form a reaction force that presses the ear, so that the sound generation portion 11 may be pressed on the anterolateral side of the auricle (e.g., the area M1 and the area M2 shown in FIG. 1), thereby increasing the resistance of the earphone 10 from falling off the ear. Fourth, the sound generation portion 11 and the suspension structure 12 may be disposed to clamp the antihelix area, the area where the concha cavity is located, etc. from the anterolateral side and posterior medial side of the auricle in the wearing state, thereby increasing the resistance of the earphone 10 from falling off the ear. Fifth, the sound generation portion 11 or the structure connected thereto may be disposed to at least partially extend into cavities such as the concha cavity 102, the cymba conchae 103, the triangular fossa 104, or the scapha 106, thereby increasing the resistance of the earphone 10 from falling off the ear.

Figure 3A:
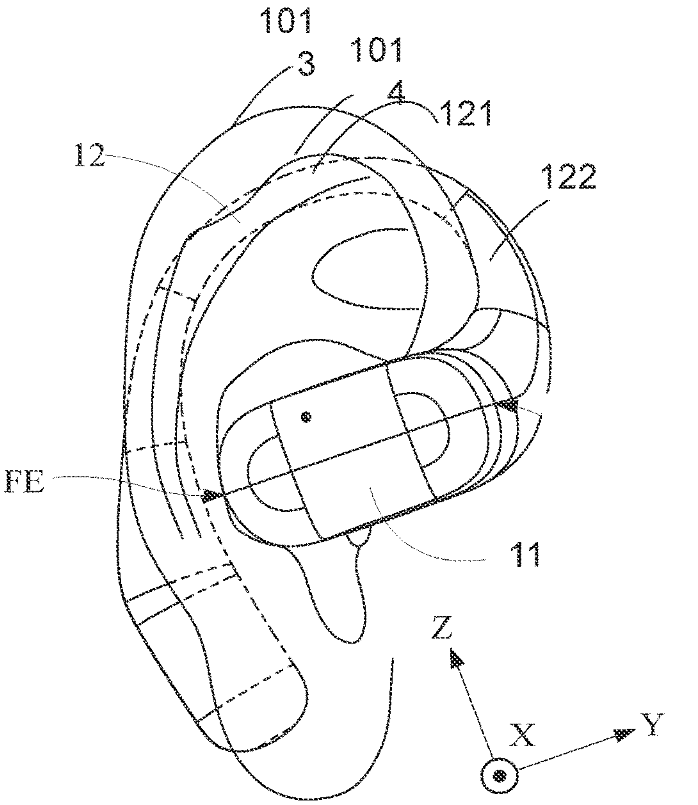
FIG. 3A is a schematic diagram illustrating an exemplary wearing of an earphone according to some embodiments of the present disclosure.

Exemplarily, with reference to FIG. 3A, in the wearing state, an end FE (also referred to as a free end) of the sound generation portion 11 may protrude into the concha cavity. Optionally, the sound generation portion 11 and the suspension structure 12 may be disposed to clamp an ear area from the front and rear sides of the ear area corresponding to the concha cavity, thereby increasing the resistance of the earphone 10 from falling off the ear, and improving the stability of the earphone 10 in the wearing state. For example, the end FE of the sound generation portion may be pressed in the concha cavity in the thickness direction X. As another example, the end FE may abut against the concha cavity in the long axis direction Y and/or the short axis direction Z (e.g., abut against an inner wall of the concha cavity opposite to the end FE). It should be noted that the end FE of the sound generation portion 11 refers to the end of the sound generation portion 11 opposite to a fixed end connected to the suspension structure 12. The end FE may also be referred to as the free end. The sound generation portion 11 may be a regular or irregular structure, and here, in order to further illustrate the end FE of the sound generation portion 11, an exemplary description is given. For example, when the sound generation portion 11 is a cuboid structure, an end wall of the sound generation portion 11 may be a plane. At this time, the end FE of the sound generation portion 11 may be an end side wall of the sound generation portion 11 opposite to the fixed end connected to the suspension structure 12. As another example, when the sound generation portion 11 is a sphere, an ellipsoid, or an irregular structure, the end FE of the sound generation portion 11 may refer to a specific area obtained by cutting the sound generation portion 11 along a Y-Z plane (i.e., the plane formed by the short axis direction Z and the thickness direction X), which is away from the fixed end. A ratio of a size of the specific area along the long axis direction Y to the size of the sound generation portion along the long axis direction Y may be in a range of 0.05-0.2.

By extending the sound generation portion 11 at least partially into the concha cavity, a listening volume at a listening position (e.g., at an opening of the ear canal), especially the listening volume at middle and low frequencies, may be improved. At the same time, a good far-field sound leakage canceling effect may be maintained. Merely by way of example, when the whole or portion of the structure of the sound generation portion 11 extends into the concha cavity 102, the sound generation portion 11 and the concha cavity 102 form a structure similar to a cavity (hereinafter referred to as a cavity-like). In the embodiments of the present disclosure, the cavity-like structure may be understood as a semi-closed structure surrounded by the side wall of the sound generation portion 11 and the concha cavity 102. The semi-closed structure may make the listening position (e.g., the opening of the ear canal) not completely airtight and isolated from the external environment, but has a leaky structure (e.g., an opening, a gap, a pipe, etc.) that communicates with the external environment acoustically. When the user wears the earphone 10, one or more sound holes may be provided on the side wall of the housing of the sound generation portion 11 near or toward the user's ear canal, and the other side walls of the housing of the sound generation portion 11 (e.g., the side wall away from or departs from the user) may be provided with one or more pressure relief holes. The one or more sound holes may be acoustically coupled with the front cavity of the earphone 10, and the one or more pressure relief holes may be acoustically coupled with the rear cavity of the earphone 10. Taking the sound generation portion 11 including one sound hole and one pressure relief hole as an example, the sound output from the sound hole and the sound output from the pressure relief hole may be approximately regarded as two sound sources, and the sounds from the two sound sources may have opposite sound phases. The inner wall corresponding to the sound generation portion 11 and the concha cavity 102 forms a cavity-like structure. The sound source corresponding to the sound hole may be located inside the cavity-like structure, and the sound source corresponding to the pressure relief hole may be located outside the cavity-like structure, to form the acoustic model shown in FIG. 5A.

Figure 3B:
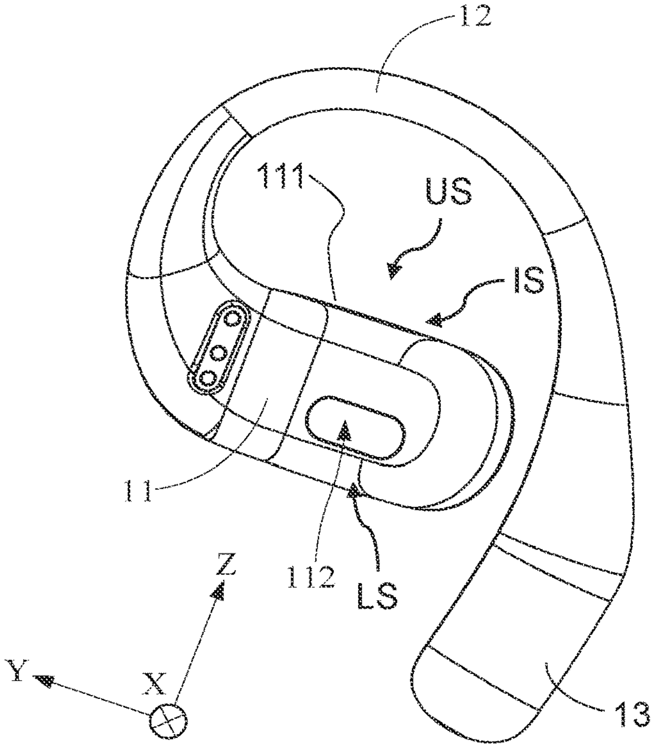
FIG. 3B is a schematic structural diagram illustrating an earphone in a non-wearing state according to some embodiments of the present disclosure.

Referring to FIGS. 3A and 3B, an earhook is described hereinafter as an example of the suspension structure 12. In some embodiments, the earhook may include a first portion 121 and a second portion 122 connected in sequence. The first portion 121 may be hung between a posterior medial side of the auricle and the head of the user, the second portion 122 may extend toward the anterolateral side of the ear (the side of the ear away from the head along the coronal axis) and connect to the sound generation portion, so that the sound generation portion may be fixed near the ear canal of the user without blocking an opening of the ear canal. In some embodiments, the at least one sound hole may be disposed on the side wall of the housing facing the auricle, so that the sound generated by a transducer may be exported out of the housing and then transmitted to the opening of the ear canal of the user.

In some embodiments, the sound generation portion 11 may include the transducer and a housing 111 for accommodating the transducer. The housing 111 may be connected to the earhook. The transducer may be used to convert an electrical signal into a corresponding mechanical vibration to generate a sound. In some embodiments, a sound hole 112 may be provided on the side wall of the housing facing the auricle, and the sound hole 112 may be used to guide the sound generated by the transducer out of the housing 111 to the ear canal, so that the user may hear the sound. In some embodiments, the transducer (e.g., a diaphragm) may separate the housing 111 to form the front cavity and the rear cavity of the earphone, and the sound hole 112 may communicate with the front cavity, guide the sound generated by the front cavity out of the housing 111, and then transmit the sound to the ear canal. In some embodiments, a portion of the sound exported through the sound hole 112 may be transmitted to the ear canal so that the user may hear the sound, and the other portion may pass through a gap between the sound generation portion 11 and the ear together with the sound reflected by the ear canal (e.g., a portion of the concha cavity not covered by the sound generation portion 11), and transmit to the earphone 10 and the outside of the ear, thereby forming the first sound leakage in a far field. Meanwhile, one or more pressure relief holes may be generally disposed on other side walls of the housing 111 (e.g., the side away from or departs from the user's ear canal). The one or more pressure relief holes may be farther away from the ear canal than the sound hole 112, and the sound transmitted from the one or more pressure relief holes may generally form a second sound leakage in the far field. An intensity of the first sound leakage may be equivalent to an intensity of the second sound leakage. Moreover, phases of the aforementioned first sound leakage and phases of the aforementioned second leakage may be (approximately) opposite to each other, so that the first sound leakage and the second sound leakage may reversely cancel each other in the far field, which is beneficial to reduce the sound leakage of the earphone 10 in the far field.

As shown in FIG. 3B, in some embodiments, the sound hole 112 communicating with the front cavity may be disposed on the inner side IS of the housing 111 to guide the sound generated by the front cavity out of the housing 111 and then to the ear canal, so that the user may hear the sound. On the other side walls of the housing 111 (e.g., the upper side wall US or a lower side wall LS, etc.), the one or more pressure relief holes communicating with the rear cavity may be disposed, so as to guide the sound generated by the rear cavity out of the housing 111, and then make the sound interfere and cancel with the sound guided out of the sound hole 112 in the far field. In some embodiments, the one or more pressure relief holes may be farther away from the ear canal than the sound hole 112, so as to reduce the reverse cancellation between the sound output through the one or more pressure relief holes and the sound output through the sound hole 112 at the listening position.

Figure 5A:
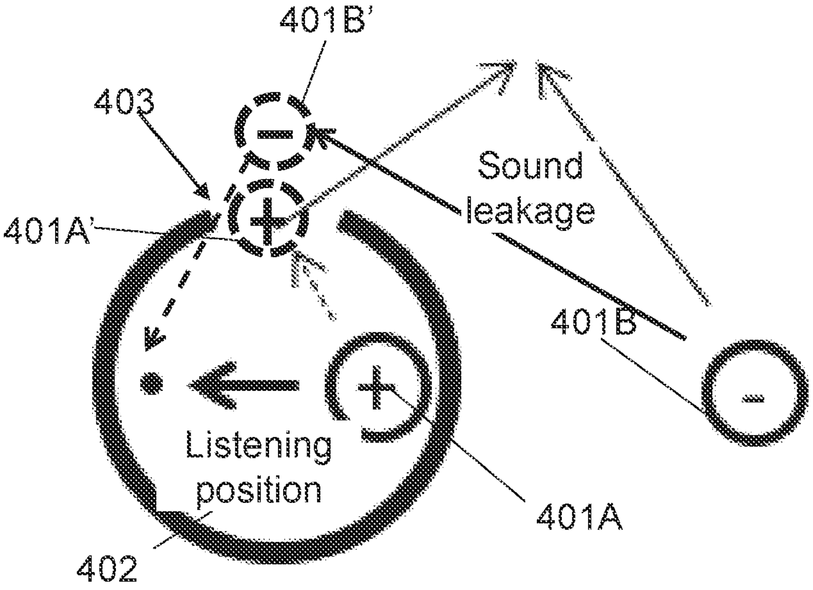
FIG. 5A is a schematic diagram illustrating an acoustic model formed by an earphone according to some embodiments of the present disclosure.

By extending the sound generation portion 11 at least partially into the concha cavity, the listening volume at the listening position (e.g., at the opening of the ear canal), especially the listening volume in the middle and low frequencies, may be improved, while a good far field sound leakage canceling effect may still be maintained. Merely by way of example, when the whole or portion of the structure of the sound generation portion 11 extends into the concha cavity 102, the sound generation portion 11 and the concha cavity 102 form a structure similar to a cavity (hereinafter referred to as the cavity-like). In the embodiments of the present disclosure, the cavity-like may be understood as a semi-closed structure surrounded by the side wall of the sound generation portion 11 and the concha cavity 102. The semi-closed structure may make the listening position (e.g., the opening of the ear canal) not completely airtight and isolated from the external environment, but has a leaky structure (e.g., an opening, a gap, a pipe, etc.) that communicates with the external environment acoustically. When the user wears the earphone 10, the one or more sound holes may be provided on the side wall of the housing of the sound generation portion 11 near or toward the user's ear canal, and the other side walls of the housing of the sound generation portion 11 (e.g., the side wall away from or departs from the user) may be provided with one or more pressure relief holes. The one or more sound holes may be coupled with the front cavity of the earphone 10, and the one or more pressure relief holes may be coupled with the rear cavity of the earphone 10. Take the sound generation portion 11 including one sound hole and one pressure relief hole as an example, the sound output by the sound hole and the sound output by the pressure relief hole may be approximately regarded as two sound sources. The sound phases of the two sound sources may be opposite, and the sound generation portion 11 and the inner wall corresponding to the concha cavity 102 form a cavity-like structure. The sound source corresponding to the sound hole may be disposed in the cavity-like structure, and the sound source corresponding to the pressure relief hole may be disposed outside the cavity-like structure to form the acoustic model shown in FIG. 5A. As shown in FIG. 5A, the cavity-like structure 402 may include a listening position and at least one sound source 401A. The "include" here may indicate that at least one of the listening position and the at least one sound source 401A may be inside the cavity-like structure 402, and may further indicate that at least one of the listening position and the at least one sound source 401A is at an inner edge of the cavity-like structure 402. The listening position may be equivalent to an entrance of the ear canal or inside the ear canal, or may be an acoustic reference point of the ear, such as an ear reference point (ERP), an ear-drum reference point (DRP), etc., or may also be an entrance structure leading to the listener, etc. A sound source 401B may be disposed outside the cavity-like structure 402, and the sound sources 401A and 401B with opposite phases respectively radiate sound to the surrounding space and produce the phenomenon of interference and cancellation of sound waves, thereby realizing the sound leakage cancelling effect. Specifically, as the sound source 401A is wrapped by the cavity-like structure 402, most of the sound radiated from the sound source 401A may reach the listening position through a direct radiation or reflection. In contrast, without the cavity-like structure 402, most of the sound radiated from the sound source 401A may not reach the listening position. Therefore, the cavity-like structure significantly increases the sound volume reaching the listening position. At the same time, only a small portion of the sound radiated from the sound source 401B with the phase opposite to the phase of the sound source 401A outside the cavity-like structure 402 enters the cavity-like structure 402 through a leakage structure 403 of the cavity-like structure 402. This is equivalent to generating a secondary sound source 401B' at the leakage structure 403, whose intensity is significantly smaller than the sound source 401B, and also significantly smaller than the sound source 401A. The sound produced by the secondary sound source 401B' may have a weak reverse cancellation on the sound source 401A in the cavity, which significantly increases the listening volume at the listening position. For the sound leakage, the sound source 401A radiates the sound to the outside through the leakage structure 403 of the cavity, which is equivalent to generating a secondary sound source 401A' at the leakage structure 403. As almost all the sound radiated by the sound source 401A is output from the leakage structure 403, and a size of the cavity-like structure 402 is much smaller than a spatial size for evaluating the sound leakage (the difference may be at least one order of magnitude), so it may be considered that an intensity of the secondary sound source 401A' is equivalent to the intensity of the sound source 401A, and a considerable reduction in sound leakage effect is still maintained.

In a specific application scenario, by extending portion or the whole structure of the sound generation portion 11 into the concha cavity, a cavity-like structure communicating with the outside world is formed between the sound generation portion 11 and a contour of the cavity. Further, the acoustic model shown in FIG. 5A may be constructed by disposing the sound hole 112 on a position of the housing of the sound generation portion toward the opening of the user's ear canal and near an edge of the concha cavity, so that the user may hear a sound with a greater listening volume when wearing the earphone. In other words, the sound generation portion 11 may have a relatively high sound output efficiency by making a special design on the structure and a wearing mode of the sound generation portion 11. The relatively high sound output efficiency here may be understood as, even if a small input signal is provided to the sound generation portion 11 (e.g., a small input voltage or input power is provided to the transducer of the sound generation portion 11), the sound generation portion may still provide a sufficient sound volume to the user. That is, the sound pressure exceeding a certain threshold may be generated in the user's ear canal. More descriptions regarding the sound output efficiency may be found in the following descriptions.

Figure 4:
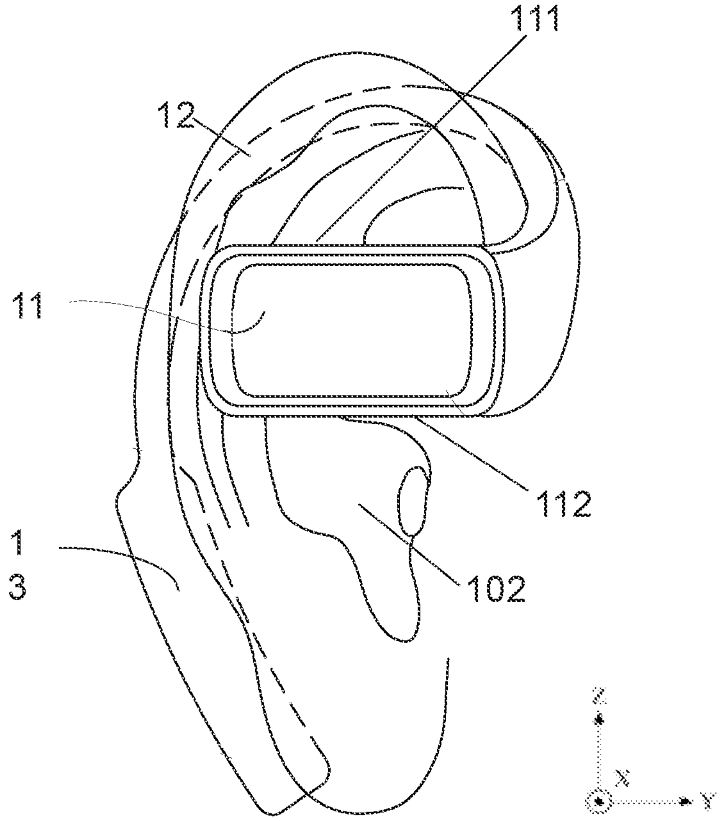
FIG. 4 is a schematic diagram illustrating an exemplary wearing of an earphone according to some embodiments of the present disclosure.

In some embodiments, the sound generation portion may have other wearing modes than protruding into the concha cavity as shown in FIG. 3A, the other wearing modes may also realize a relatively high sound output efficiency. The earphone 10 shown in FIG. 4 is described hereinafter as an example.

Figure 5B:
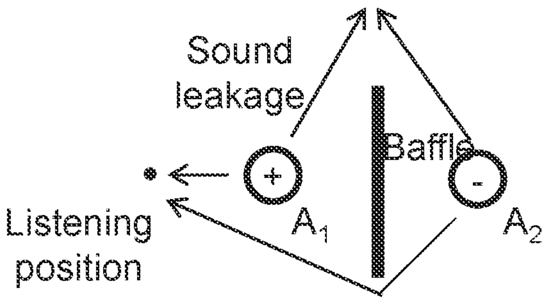
FIG. 5B is a schematic diagram illustrating an acoustic model formed by an earphone according to some embodiments of the present disclosure.

In some embodiments, when the earphone is worn, at least portion of the sound generation portion 11 may cover an antihelix area of the user. At this time, the sound generation portion 11 may be disposed above the concha cavity 102 and the opening of the ear canal, and the opening of the ear canal of the user may be in an open state. In some embodiments, the housing of the sound generation portion 11 may include at least one sound hole and at least one pressure relief hole. The at least one sound hole may be acoustically coupled with the front cavity of the earphone 10, and the at least one pressure relief hole may be acoustically coupled with the rear cavity of the earphone 10. The sound output from the at least one sound hole and the sound output from the at least one pressure relief hole may be approximately regarded as two sound sources, and the sounds from the two sound sources may have opposite phases. When the user wears the earphone, the at least one sound hole may be disposed on the side wall of the sound generation portion 11 facing or close to the opening of ear canal of the user, and the at least one pressure relief hole may be disposed on the side wall of the sound generation portion 11 away from or depart from the opening of ear canal of the user. At this time, the sound generation portion 11 and the user's auricle may form a baffle. The sound source corresponding to the at least one sound hole may be disposed on one side of the baffle, and the sound source corresponding to the at least one pressure relief hole bypasses the sound generation portion 11 and the user's auricle, and may be disposed on the other side of the baffle, thereby forming the acoustic model shown in FIG. 5B. As shown in FIG. 5B, when the baffle is disposed between a sound source A1 and a sound source A2, in the near field, the sound field of the sound source A2 needs to bypass the baffle to interfere with the sound wave of the sound source A1 at the listening position, which is equivalent to increasing a sound path from the sound source A2 to the listening position. Therefore, assuming that the sound source A1 and the sound source A2 have the same amplitude, compared with the case where no baffle is disposed, an amplitude difference of the sound waves of the sound source A1 and the sound source A2 at the listening position increases, so that the cancellation of the sounds from the two sources at the listening position is reduced, causing a sound volume increase at the listening position. In the far field, as the sound waves generated by the sound source A1 and the sound source A2 may interfere without bypassing the baffle in a greater spatial range (similar to the case of no baffle), compared with the case where no baffle is disposed, the sound leakage in the far field may not increase significantly. Therefore, disposing the baffle structure around one of the sound sources A1 and A2 may significantly increase the sound volume of the listening position in the near field without significantly increasing the leakage sound volume in the far field.

In a specific application scenario, by covering at least portion of the sound generation portion 11 on the antihelix area of the user, the user may hear a greater listening volume when wearing the earphone. The mode may also make the sound generation portion 11 have a relatively high sound output efficiency.

As mentioned above, the sound wave generated by the transducer may be transmitted through the at least one sound hole so as to pass into the external ear canal. The transducer refers to a component that receives an electrical signal and converts the electrical signal into the sound signal for output. In some embodiments, the transducer may include a diaphragm, a voice coil, and a magnetic circuit component. One end of the voice coil may be fixedly connected to the diaphragm, and the other end may extend into a magnetic gap formed by the magnetic circuit component. By supplying current to the voice coil, the voice coil may be made to vibrate in the magnetic gap, which drives the diaphragm to vibrate to generate the sound wave.

Compared with other earphones (e.g., earbuds, over-ear headphones, etc.), an ambient sound may be more likely to enter the user's ear canal, thereby affecting the listening effect of the earphone 10. In this case, the earphone 10 may need to provide a higher sound volume to ensure a better listening effect. Through the special design of the structure and wearing mode of the sound generation portion 11 described elsewhere in the present disclosure (e.g., forming an acoustic model as shown in FIG. 5A or 5B), a sufficient sound pressure in the ear canal may be ensured when the input power (or the input voltage) of the transduction is relatively small.

For ease of expression, the following description may take the listening position disposed in the ear canal as an example. It should be noted that, in other embodiments, the listening position may also be the ear acoustic reference point mentioned above, such as the ERP, the DRP, etc., or the listening position may be an entrance structure leading to the listener, etc. The sound pressures corresponding to the above positions may also increase or reduce accordingly.

In some embodiments, the sound pressure in the ear canal described in the present disclosure may be measured by performing the following operations. A simulator containing the head and the ears described above may be used as a reference object for wearing the acoustic device, and a test may be performed to obtain the sound pressure provided by the sound generation portion 11 into the ear canal. For example, a device with a playback function (e.g., a mobile phone, a digital acoustics processor (DAP), etc.) may be connected to the earphone 10 and control the earphone to play a sweep signal (e.g., the sweep signal with a frequency range of 20 Hz to 20000 Hz). The playback device may generate output signals corresponding to different sound levels. For example, the signal output by the playback device may include a plurality of sound levels, each sound level corresponding to a different input voltage or input current of the input signal of the transducer. The output signal of each sound level may be used to control the earphone 10 to play the sweep signal, and record the sound pressure generated by the transducer and delivered to the ear canal corresponding to different input voltages or input currents of the input signals. For example, the sound volume of the playback device may be divided into 8 sound levels, and the sound levels from a maximum sound volume to a minimum sound volume may be the maximum sound volume, a sound level one level lower than the maximum sound volume (−1 level), a sound level two level lower than the maximum sound volume (−2 level), a sound level third level lower than the maximum sound volume (−3 level), . . . , a sound level seven level lower than the maximum sound volume (−7 level). It should be noted that, in some other embodiments, a range between the maximum sound volume and the minimum sound volume of the playback device may be divided into other sound levels, such as 3, 5, 20, etc. In some embodiments, the output signal of the playback device may be a sinusoidal signal.

The ear canal of the simulator including the head and the ears may be provided with a microphone connected to a sound input device (e.g., a computer sound card, an analog to digital converter (ADC), etc.). A processing device (e.g., a computer) may further receive a level signal converted by the microphone, and perform recording or processing.

In some embodiments, the sound pressure in the ear canal may also be measured by performing the following operations. An artificial head model or artificial ear model not specific for a non-acoustic measurement may be obtained. The end of the ear canal of the model may be sealed to form a structure similar to the human ear. An acoustic test microphone may be disposed in the ear canal of the model, and the level signal converted by the microphone may be collected to replace the aforementioned simulator including the head and the ears, so as to obtain the sound pressure in the ear canal.

A hearing frequency range of the human ear is roughly between 20 Hz and 20,000 Hz, but the hearing of the human ear is not sensitive to some frequency bands, such as low frequency bands (e.g., below 300 Hz) or high frequency bands (e.g., above 5000 Hz). In some embodiments, by specially designing the structure and wearing mode of the sound generation portion 11, the sound generation portion 11 may have relatively high sound output efficiency in a specific frequency range. That is, when the input voltage and the input power of the input signal of the transducer is constant, the sound generation portion 11 may provide the user with a sufficient sound volume within the specific frequency range, so that a sound pressure exceeding a specific threshold may be generated in the user's ear canal. For example, under the condition of a constant input voltage of the transducer, the earphone 10 has a better listening effect by increasing the sound pressure provided by the sound generation portion 11 for the ear canal in a range of 300 Hz-5000 Hz. In some embodiments, in order to give priority to ensuring the listening effect within the sensitive range of the human ear, the sound pressure provided by the sound generation portion 11 to the ear canal may be increased in a range of 600 Hz-2000 Hz under the condition of a certain input voltage of the transducer, so that the earphone 10 may have a better listening effect.

Figure 6:
FIG. 6 illustrates sound pressure level curves in an ear canal in a wearing mode in which a sound generation portion at least partially extends into a concha cavity according to some embodiments of the present disclosure.

FIG. 6 illustrates sound pressure level (SPL) curves in an ear canal in the wearing mode in which the sound generation portion 11 at least partially extends into the concha cavity, wherein an abscissa indicates a frequency, and a unit of the frequency is Hz; an ordinate indicates the sound pressure, and a unit of the sound pressure is dB. A solid line 610 in FIG. 6 represents an SPL curve of the earphone 10 in the ear canal when a playback device outputs a signal with the maximum sound level, and other lines represent SPL curves of the earphone 10 in the ear canal when the playback device outputs signals with sound levels lower than the maximum sound level (−1 level to −7 level).

Figure 7:
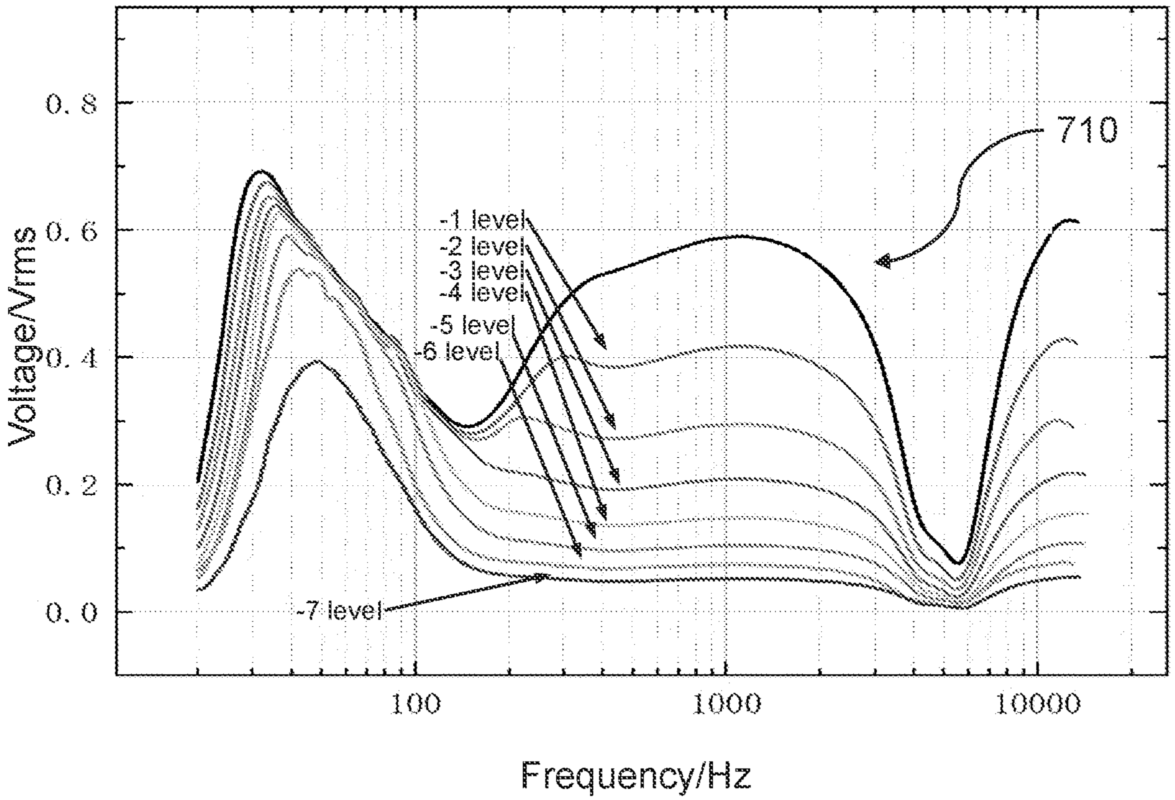
FIG. 7 illustrates input voltage-frequency curves corresponding to FIG. 6.

FIG. 7 illustrates input voltage-frequency curves corresponding to FIG. 6, wherein an abscissa indicates the frequency, and a unit of the frequency is Hz; an ordinate indicates an input voltage of an input signal of a transducer, and the unit of the input voltage is V. It should be noted that when the input signal of the transducer is a sinusoidal signal, the input voltage of the input signal may also be understood as an effective voltage value (e.g., a voltage root mean square (Vrms)) corresponding to the sinusoidal signal. In FIG. 7, a solid line 710 represents the input voltages of the transducer of the earphone 10 corresponding to different frequencies when the playback device outputs the output signal with the maximum sound level, and other solid lines represent the input voltages of the transducer corresponding to different frequencies when the playback device outputs signals with sound levels lower than the maximum sound level (−1 level to −7 level). For an easy understanding, the input voltage of the transducer may be obtained by a tester through obtaining the voltage at a connection terminal of the transducer (e.g., a connection between a voice coil and an external wire) when the transducer is playing a sweep signal. For example, wires may be drawn from solder spots of the connection terminal of the transducer, and connected to a filter. Then the wires may be connected to the filter and the tester, and voltage data of the tester may be obtained through a processing device (e.g., a computer).

In some embodiments, the wires between the transducer and the battery or a driving circuit may be cut off and drawn out from the housing of the sound generation portion 11, and the drawn wires may be connected to an output end of an acoustic testing device. When the test is performed, an input signal of the acoustic testing device may be set to determine the input voltage of the above input signal, and different input voltages of the acoustic testing device may be set according to actual test requirements. In some embodiments, the acoustic testing device may be a device that selectively outputs a sine wave corresponding to a specific voltage or current.

By adopting the design of extending the sound portion 11 into the concha cavity, a cavity-like structure as shown in FIG. 5A may be formed, more sound generated by the sound hole 112 (that is, the sound source 401A in FIG. 5A) in the cavity-like may be guided to the ear canal, and less sound generated by the pressure relief hole outside the cavity-like (that is, the sound source 401B in FIG. 5A) may enter the cavity-like for cancellation, thus enabling the sound generation portion 11 to provide a greater sound pressure to the ear canal. In some embodiments, it may be seen from FIG. 6 and FIG. 7 that in at least one frequency range, when the input voltage of the transducer does not exceed 0.6V, a maximum sound pressure that the sound generation portion 11 is able to provide to the ear canal may not be smaller than 75 dB.

Exemplarily, taking the frequency of 1000 Hz as an example, it may be seen from the solid line 610 in FIG. 6 that when the frequency is 1000 Hz, the maximum sound pressure provided to the ear canal may be 79 dB, and referring to FIG. 7, the input voltage of the transducer when the frequency is 1000 Hz may be 0.6V. That is, when the frequency is 1000 Hz and the input voltage of the transducer does not exceed 0.6V, by adopting a design of partially inserting the sound generation portion 11 into the concha cavity, the maximum sound pressure that the sound generation portion 11 is able to provide to the ear canal may not be smaller than 75 dB.

In addition, it may be seen from FIG. 6 and FIG. 7 that when the frequency is 500 Hz, the maximum sound pressure provided by the sound generation portion 11 to the ear canal may be 80 dB, and the input voltage of the transducer may be 0.58 V. That is, when the frequency is 500 Hz and the input voltage of the transducer does not exceed 0.59V, by adopting the design of partially inserting the sound generation portion 11 into the concha cavity, the maximum sound pressure that the sound generation portion 11 is able to provide to the ear canal may not be smaller than 80 dB. It may be seen from FIG. 6 and FIG. 7 that when the frequency is 800 Hz and the input voltage of the transducer does not exceed 0.59V, by adopting the design of partially inserting the sound generation portion 11 into the concha cavity, the maximum sound pressure that the sound generation portion 11 is able to provide to the ear canal may not be smaller than 79 dB. When the frequency is 2000 Hz and the input voltage of the transducer does not exceed 0.55V, by adopting the design of partially inserting the sound generation portion 11 into the concha cavity, the maximum sound pressure that the sound generation portion 11 is able to provide to the ear canal may not be smaller than 83 dB.

Continue to refer to FIG. 6 and FIG. 7. It may be seen from FIG. 6 and FIG. 7 that within the frequency range of 300 Hz-4000 Hz, by adopting the designing of partially inserting the sound generation portion 11 into the concha cavity, when the input voltage of the transducer does not exceed 0.6V, the maximum sound pressure that the sound generation portion 11 is able to provide to the ear canal may not be smaller than 73 dB. In the frequency range of 700 Hz-1500 Hz, by adopting the design of partially inserting the sound generation portion 11 into the concha cavity, when the input voltage of the transducer does not exceed 0.6V, the maximum sound pressure that the sound generation portion 11 is able to provide to the ear canal may not be smaller than 75 dB. In the frequency range of 2500 Hz-4000 Hz, by adopting the design of partially inserting the sound generation portion 11 into the concha cavity, when the input voltage of the transducer does not exceed 0.55V, the maximum sound pressure that the sound generation portion 11 is able to provide to the ear canal may not be smaller than 75 dB.

It can be seen that, in the wearing mode in which the sound generation portion 11 at least partially extends into the concha cavity, in at least one frequency range (e.g., 300 Hz-4000 Hz), when the sound generation portion 11 does not exceed 0.6V, the maximum sound pressure that the sound generation portion 11 is able to provide to the ear canal may not be smaller than 75 dB. In some embodiments, by optimizing volumes, masses and sizes of the sound generation portion 11 and a battery compartment 13, the sound output efficiency of the sound generation portion 11 may be further improved, so that when the input voltage of the transducer does not exceed 0.6V, the maximum sound pressure that the sound generation portion 11 is able to provide to the ear canal may not be smaller than 78 dB. For the description of the volumes, the masses and the sizes of the sound generation portion 11 and the battery compartment 13, please refer to the related descriptions in FIG. 10 and FIG. 11 as follows.

In some embodiments, according to different power supply conditions (e.g., different sound levels of the playback devices, different models of the earphones 10, different specifications of batteries, etc.), and when the input voltage of the transducer does not exceed 0.4V, in at least one frequency range (e.g., 100 Hz-3000 Hz), by adopting the designing of partially inserting the sound generation portion 11 into the concha cavity, the maximum sound that the sound generation portion 11 is able to provide to the ear canal may not be smaller than 72 dB.

Referring to FIG. 6 and FIG. 7 again, when the frequency is 400 Hz and the sound level of the playback device is −1 level, the input voltage of the transducer may be 0.39V and the maximum sound pressure provided by the sound generation portion 11 into the ear canal may be 76 dB. When the frequency is 1500 Hz and the sound level of the playback device is −2 level, the input voltage of the transducer is 0.3V and the maximum sound pressure provided by the sound generation portion 11 to the ear canal may be 78 dB. When the frequency is in a range of 200 Hz-3000 Hz, the maximum input voltage of the transducer does not exceed 0.3V and the sound pressure provided by the sound generation portion 11 to the ear canal may not be smaller than 74 dB. It may be seen that when the input voltage of the transducer is lowered, the sound generation portion 11 may still provide relatively great sound pressure to the ear canal, thereby ensuring a good listening effect of the earphone 10.

In some embodiments, for the wearing mode in which the sound generation portion 11 is at least partially disposed at the antihelix as shown in FIG. 4, by adopting the design of partially disposing the sound generation portion 11 at the antihelix, the antihelix and the housing of the sound generation portion 11 may form a structure equivalent to the baffle as shown in FIG. 5B, which weakens the sound transmitted from the one or more pressure relief holes to the ear canal (e.g., the sound source A2 in FIG. 5B). As a result, a degree of sound cancellation at the ear canal may be weakened, and the user hears the sound with a higher sound volume (e.g., the sound source A1 as shown in FIG. 5N). That's to say, the sound generation portion 11 may provide a greater sound pressure into the ear canal. In some embodiments, in at least one frequency range, under the condition that the input voltage of the transducer does not exceed 0.6V, the maximum sound pressure that the sound generation portion 11 is able to provide to the ear canal may not be smaller than 70 dB.

Exemplarily, when the frequency is 1000 Hz and the input voltage of the transducer does not exceed 0.6V, by adopting the design of partially disposing the sound generation portion 11 at the antihelix, under the wearing mode of partially disposing the sound generation portion 11 at the antihelix, the maximum sound pressure that the sound generation portion 11 is able to provide to the ear canal may not be smaller than 72 dB or 70 dB. In the frequency range of 300 Hz-4000 Hz, the sound generation portion 11 may be at least partially disposed at the antihelix, when the input voltage of the transducer does not exceed 0.6V, the maximum sound pressure that the sound generation portion 11 is able to provide to the ear canal may not be smaller than 73 dB. In the frequency range of 700 Hz-1500 Hz, the sound generation portion 11 may be at least partially disposed at the antihelix, when the input voltage of the transducer does not exceed 0.6V, the maximum sound pressure that the sound generation portion 11 is able to provide to the ear canal may not be smaller than 71 dB.

When the input voltage of the transducer reduces, the sound pressure that the sound generation portion 11 is able to provide to the ear canal may decrease accordingly. By optimizing the volumes, the masses, and the sizes of the sound generation portion 11 and the battery compartment 13, even if the input voltage of the transducer is reduced, a suitable sound pressure may be generated in the ear canal.

Figure 8:
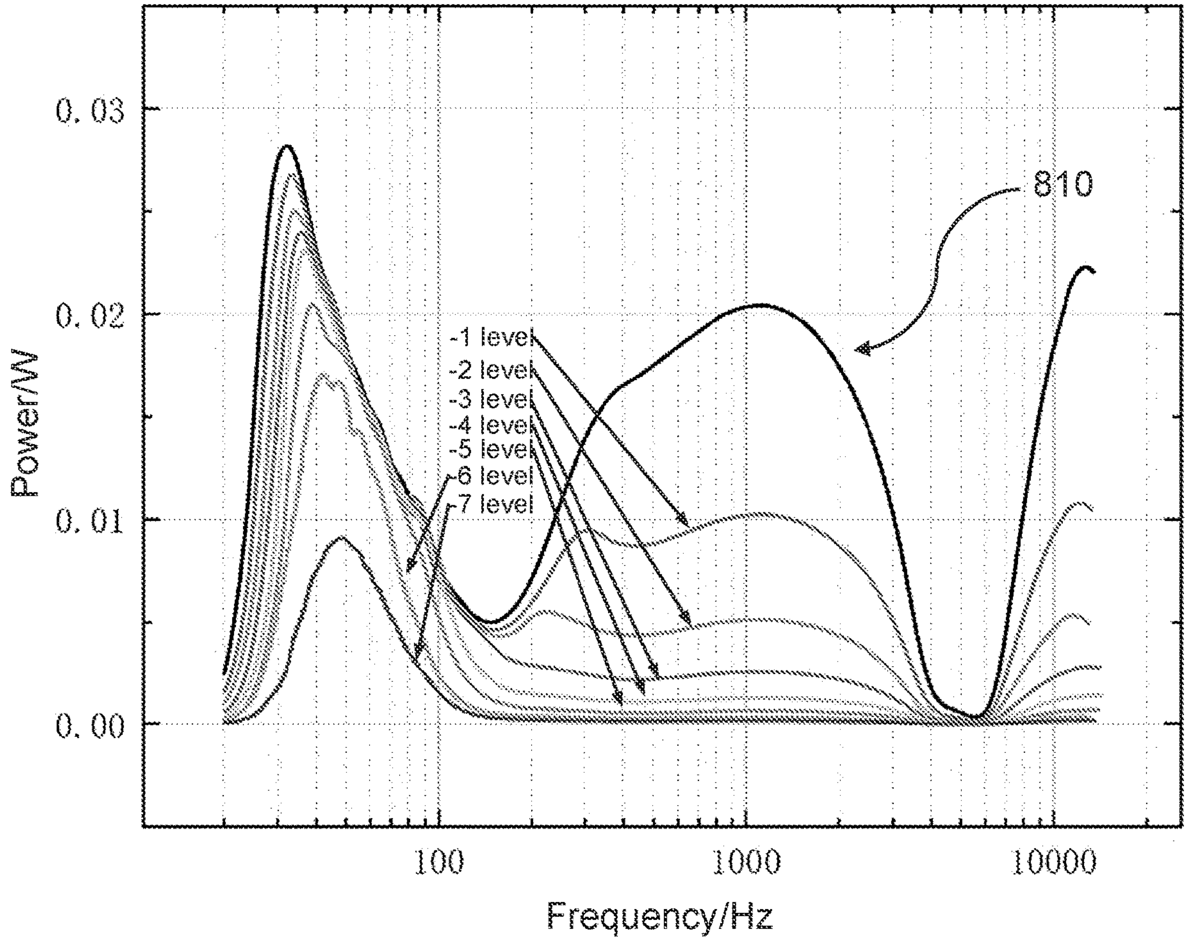
FIG. 8 illustrates input power-frequency curves corresponding to FIG. 6.

In some embodiments, the relationship between the input power of the transducer and the sound pressure in the ear canal may also reflect the sound output efficiency of the sound generation portion 11. For example, the relatively high sound output efficiency may be understood as that, even if a small input power is provided to the transducer, the sound generation portion 11 may still provide a sufficient sound volume to the user, that is, the sound pressure exceeding a certain threshold may be generated in the user's ear canal. FIG. 8 illustrates input power-frequency curves corresponding to FIG. 6. A solid line 810 in FIG. 8 represents a sound pressure level curve of the earphone 10 when a playback device outputs an output signal with the maximum sound level, and other solid lines represent the sound pressure level curves of the earphone 10 when the playback device outputs signals with sound levels lower than the maximum sound level (−1 level to −7 level). In some embodiments, the input power may be determined from an input voltage and/or an input current at a connection terminal of the transducer.

It can be seen from FIG. 6 and FIG. 8 that, in at least one frequency range, when the input power of the transducer does not exceed 21.1 mW, by adopting a design of partially extending the sound portion 11 into the concha cavity, the maximum sound pressure that the sound generation portion 11 is able to provide to the ear canal may not be smaller than 75 dB.

Exemplarily, taking a frequency of 1000 Hz as an example, it may be seen from FIG. 6 that the maximum sound pressure provided by the sound generation portion 11 to the ear canal is 79 dB when the frequency is 1000 Hz. Referring to FIG. 8, when the frequency is 1000 Hz, the input power of the transducer is 21.1 mW. That is to say, when the frequency is 1000 Hz and the input power of the transducer does not exceed 21.1 mW, by adopting a design of partially extending the sound portion 11 into the concha cavity, the maximum sound that the sound generation portion 11 is able to provide to the ear canal may not be smaller than 75 dB.

In addition, it may be seen from FIG. 6 and FIG. 8 that when the frequency is 500 Hz, the maximum sound pressure provided by the sound generation portion 11 to the ear canal is 80 dB, and the input power of the transducer is 19.8 mW. That is to say, when the frequency is 500 Hz and the input power of the transducer does not exceed 19.8 mW, by adopting the design of partially extending the sound generation portion 11 into the concha cavity, the maximum sound pressure that the sound generation portion 11 is able to provide to the ear canal may not be smaller than 80 dB. Based on FIG. 6 and FIG. 8, it may also be determined that when the frequency is 800 Hz and the input power of the transducer does not exceed 19.8 mW, by adopting the design of partially extending the sound generation portion 11 into the concha cavity, the maximum sound pressure that the sound generation portion 11 is able to provide to the ear canal may not be smaller than 79 dB. When the frequency is 2000 Hz and the input power of the transducer does not exceed 17.8 mW, the maximum sound pressure that the sound generation portion 11 is able to provide to the ear canal may not be smaller than 83 dB.

Continuing to refer to FIG. 6 and FIG. 8, it may be seen that in the frequency range of 300 Hz~4000 Hz, by adopting the design of partially extending the sound generation portion 11 into the concha cavity, when the input power of the transducer does not exceed 21.1 mW, the maximum sound pressure that the sound generation portion 11 is able to provide to the ear canal may not be smaller than 79 dB. In the frequency range of 700 Hz~1500 Hz, by adopting the design of partially extending the sound generation portion 11 into the concha cavity, when the input power of the transducer does not exceed 21.1 mW, the maximum sound pressure that the sound generation portion 11 is able to provide to the ear canal may not be smaller than 75 dB. In a range of 2500 Hz~4000 Hz, by adopting the designing of partially extending the sound generation portion 11 into the concha cavity, when the input power of the transducer does not exceed 17.8 mW, the maximum sound pressure that the sound generation portion 11 is able to provide to the ear canal may not be smaller than 75 dB.

It may be seen that, in the wearing mode in which the sound generation portion 11 is at least partially inserted into the concha cavity, in at least one frequency range (e.g., 300 Hz~4000 Hz), when the input power of the transducer does not exceed 21.1 mW, the maximum sound pressure that the sound generation portion 11 is able to provide to the ear canal may not be smaller than 75 dB. In some embodiments, by optimizing volumes, masses, and sizes of the sound generation portion 11 and the battery compartment 13, the sound output efficiency of the sound generation portion 11 may be further improved, so that when the input power of the transducer does not exceed 21.1 mW, the maximum sound pressure that the sound generation portion 11 is able to provide to the ear canal may not be smaller than 78 dB.

In some embodiments, based on a similar manner as to the voltage and input power in FIG. 7 and FIG. 8, input current-frequency curves (not shown) reflecting a relationship between the input current of the transducer and the frequency may also be determined. In some embodiments, by adopting the design of partially extending the sound generation portion 11 into the concha cavity, in at least one frequency range, when an input current of the transducer does not exceed 35.3 mA, the maximum sound pressure that the sound generation portion 11 is able to provide to the ear canal may not be smaller than 75 dB.

Exemplarily, taking a frequency of 1000 Hz as an example, it may be seen from FIG. 6 that the maximum sound pressure provided by the sound generation portion 11 to the ear canal may be 79 dB when the frequency is 1000 Hz. The input current of the transducer is 35.3 mA when the frequency is 1000 Hz. That is to say, when the frequency is 1000 Hz, by adopting the design of partially extending the sound generation portion 11 into the concha cavity, when the input current of the transducer does not exceed 35.3 mA, the maximum sound pressure that the sound generation portion 11 is able to provide to the ear canal may not be smaller than 75 dB.

In addition, when the frequency is 500 Hz, the maximum sound pressure provided by the sound generation portion 11 to the ear canal is 80 dB, and the input current of the transducer is 34.1 mA. That is to say, when the frequency is 500 Hz and the input current of the transducer does not exceed 34.1 mW, by adopting the design of partially extending the sound generation portion 11 into the concha cavity, the maximum sound pressure that the sound generation portion 11 is able to provide to the ear canal may not be smaller than 80 dB. When the frequency is 800 Hz and the input current of the transducer does not exceed 34.1 mW, by adopting the design of partially extending the sound generation portion 11 into the concha cavity, the maximum sound pressure that the sound generation portion 11 is able to provide to the ear canal may not be smaller than 79 dB. When the frequency is 2000 Hz and the input current of the transducer does not exceed 17.8 mA, by adopting the design of partially extending the sound generation portion 11 into the concha cavity, the maximum sound pressure that the sound generation portion 11 is able to provide to the ear canal may not be smaller than 83 dB. In addition, in the frequency range of 300 Hz to 4000 Hz, by adopting the design of partially extending the sound generation portion 11 into the concha cavity, when the input current of the transducer does not exceed 35.3 mW, the maximum sound pressure that the sound generation portion 11 is able to provide to the ear canal may not be smaller than 79 dB. In the frequency range of 700 Hz~1500 Hz, by adopting the design of partially extending the sound generation portion 11 into the concha cavity, when an input voltage of the transducer does not exceed 35.3 V, the maximum sound pressure that the sound generation portion 11 is able to provide to the ear canal may not be smaller than 75 dB. In a range of 2500 Hz~4000 Hz, by adopting the designing of partially extending the sound generation portion 11 into the concha cavity, when the input voltage of the transducer does not exceed 32.4V, the maximum sound pressure that the sound generation portion 11 is able to provide to the ear canal may not be smaller than 75 dB.

Figure 9:
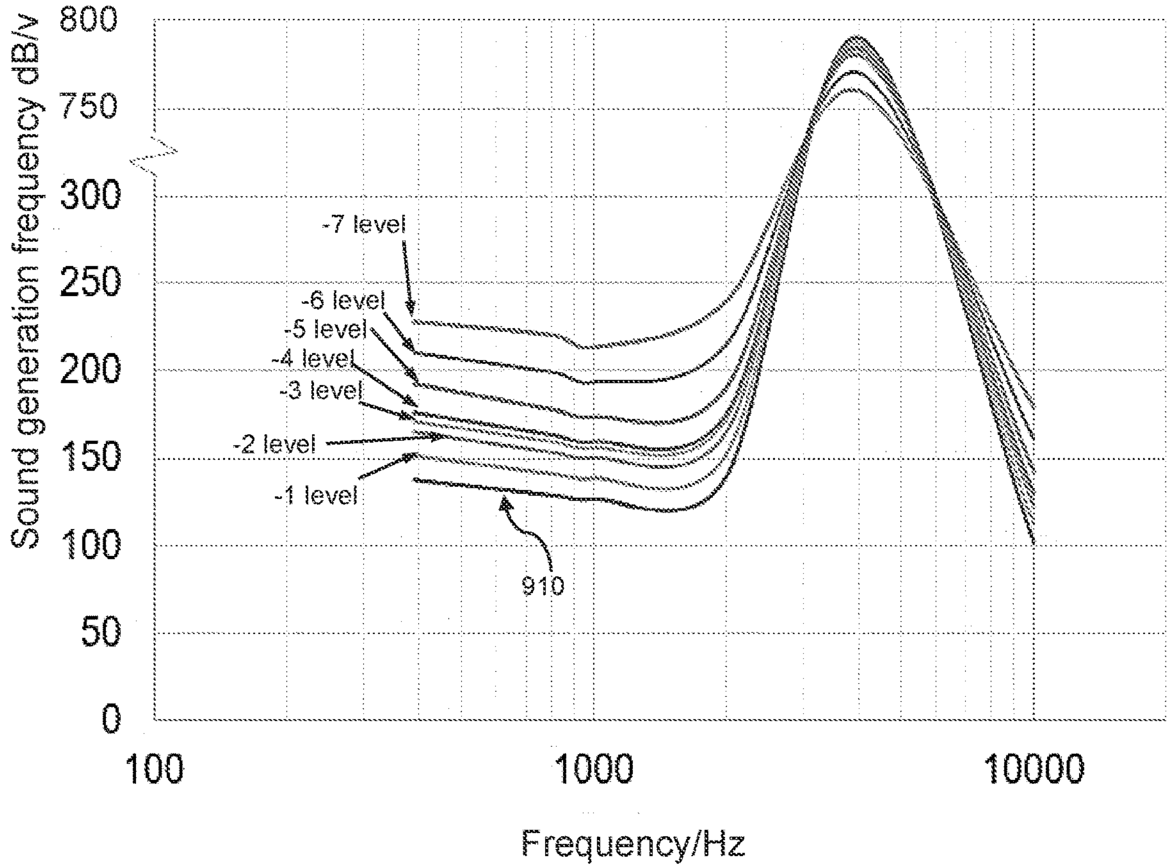
FIG. 9 illustrates sound generation efficiency-frequency curves corresponding to FIG. 6.

In some embodiments, a ratio of the sound pressure provided by the sound generation portion 11 to the ear canal to the input voltage of the transducer (also referred to as a sound generation efficiency of the sound generation portion 11) may also reflect the sound output efficiency of the sound generation portion 11. FIG. 9 illustrates sound generation efficiency-frequency curves corresponding to FIG. 6, wherein, an abscissa represents the frequency, and a unit of the frequency is Hz; an ordinate represents a sound generation efficiency of the sound generation portion 11, and a unit of the sound generation efficiency is dB/V. In FIG. 9, a solid line 910 represents the sound generation efficiency of the sound generation portion 11 of the earphone 10 when a playback device outputs an output signal with the maximum sound level, and the other solid lines represent the sound generation efficiencies of the sound generation portion 11 corresponding to different frequencies when the playback device outputs signals with sound levels lower than the maximum sound level (−1 level to −7 level).

It may be seen from FIG. 9, in at least one frequency range, by adopting a design of partially extending the sound generation portion 11 into the concha cavity, the sound generation efficiency of the sound generation portion 11 may not be smaller than 100 dB/V.

Exemplarily, taking a frequency of 1000 Hz as an example, it may be seen from a solid line 910 in FIG. 9 that by adopting a design of partially extending the sound generation portion 11 into the concha cavity, when the frequency is 1000 Hz, the sound generation efficiency of the sound generation portion 11 is 128 dB/V. In addition, when the frequency is 500 Hz, the sound generation efficiency of the sound generation portion 11 is 140 dB/V. When the frequency is 800 Hz, by adopting the design of partially extending the sound generation portion 11 into the concha cavity, the sound generation efficiency of the sound generation portion 11 is 130 dB/V. When the frequency is 2000 Hz, by adopting a design of partially extending the sound generation portion 11 into the concha cavity, the sound generation efficiency of the sound generation portion 11 is 100 dB/V.

Continuing to refer to FIG. 6 and FIG. 7, it may be seen from FIG. 6 and FIG. 7 that in the frequency range of 500 Hz~2000 Hz, by adopting the design of partially extending the sound generation portion 11 into the concha cavity, the sound generation efficiency of the sound generation portion 11 may not be smaller than 120 dB/V. Referring to the solid lines corresponding to other sound levels, it may be seen that in the frequency range of 500 Hz~2000 Hz, by adopting the designing of partially extending the sound generation portion 11 into the concha cavity, the sound generation efficiency may be in a range of 100-250 dB/V. When the frequency is 10000 Hz, by adopting the design of partially extending the sound generation portion 11 into the concha cavity, the sound generation efficiency may not be smaller than 100 dB/V. From FIG. 6 and FIG. 7, it may be seen that by adopting the designing of partially extending the sound generation portion 11 into the concha cavity, in a frequency range of 3000 Hz~5000 Hz, the sound generation portion 11 may also generate a relatively high sound pressure in an ear canal under a condition of a relatively low input voltage.

It may be seen that in the wearing mode in which the sound generation portion 11 at least partially extends into the concha cavity, the sound generation portion 11 may obtain a relatively high sound generation efficiency in at least one frequency range (e.g., 500 Hz~4000 Hz).

In some embodiments, the higher sound generation efficiency helps to reduce and optimize volumes and masses of the sound generation portion 11 and the battery compartment 13, which is able to provide users with a more comfortable wearing feeling while ensuring a listening effect.

Specifically, if the sound pressure provided by the sound generation portion 11 to the ear canal is too low, the listening effect may reduce. For example, the sound volume of the sound heard by the user may be small and may be more easily affected by environmental sounds. In order to obtain a greater sound pressure, it is usually necessary to increase a size of the transducer or increase the input voltage of the transducer. However, increasing the size of the transducer may lead to a bulky structure of the sound generation portion 11, and increasing the input voltage of the transducer may shorten a battery life of the earphone 10 without increasing a volume of the battery. If the volume of the battery is increased in order to ensure the battery life, the volumes and the masses of the battery compartment 13 and the earphone 10 may be further increased, which affects the wearing feeling of the earphone. In some embodiments, the sound output efficiency of the sound generation portion 11 may be improved by adopting the design of partially extending the sound generation portion 11 into the concha cavity, or at least partially disposing the sound generation portion 11 at the antihelix. On this basis, relevant parameters such as the volumes and the masses of the sound generation portion 11 and the battery compartment 13 may be optimized (e.g., reducing the mass of the battery and/or the mass of the sound generation portion 11). As a result, while ensuring the listening effect, a more comfortable wearing feeling may be provided for the user.

Figure 10:
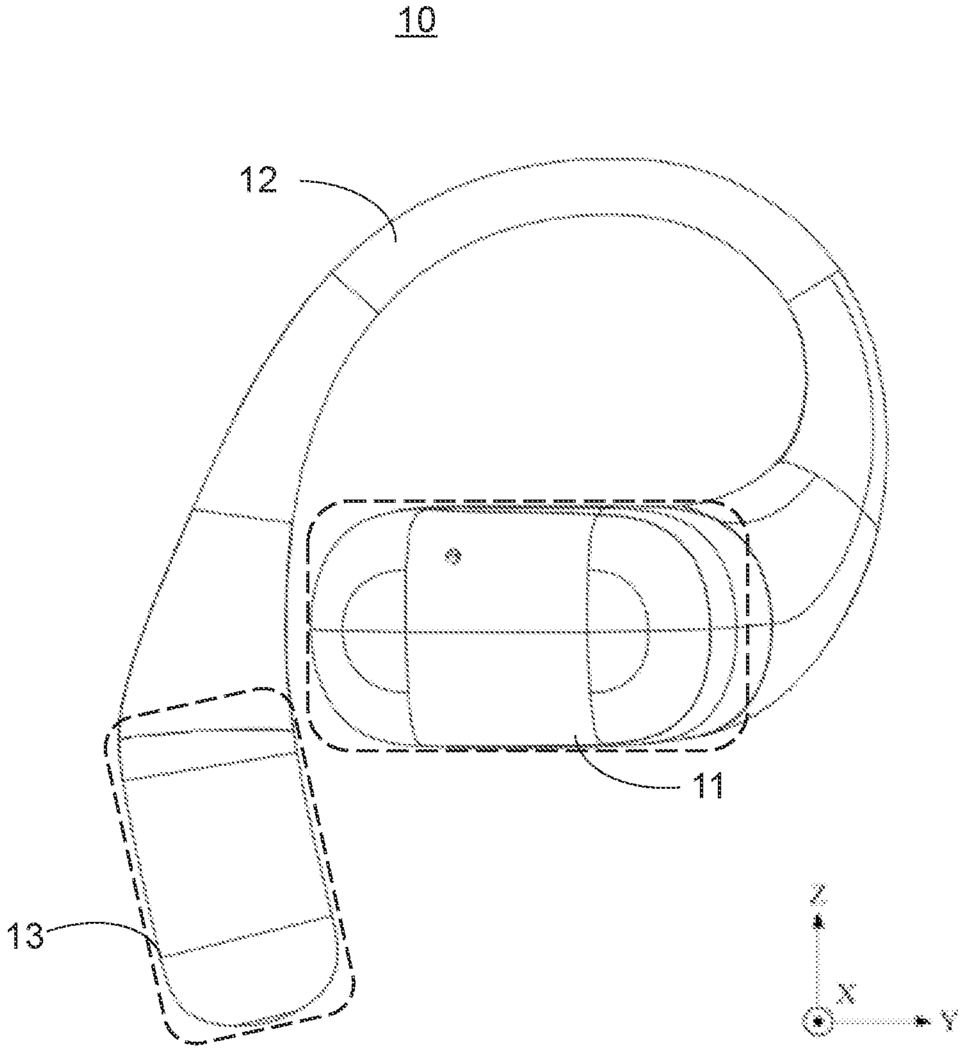
FIG. 10 is a schematic structural diagram illustrating an earphone in a non-wearing state according to some embodiments of the present disclosure.

Referring to FIG. 3A and FIG. 10, when the earphone 10 is worn, the battery compartment 13 and the sound generation portion 11 may form a lever-like structure with a certain position on an earhook as a fulcrum. If the mass of the sound generation portion 11 is too great or too small, the lever-like structure may be unstable, the earphone 10 may be worn in an unstable state. An excessive mass of the sound generation portion 11 may affect a fit between the battery compartment 13 and an auricle, and affect the cavity-like structure formed by the sound generation portion 11 and the concha cavity, thereby reducing the listening volume in the ear canal. On the basis of improving the sound output efficiency of the sound generation portion 11, the mass of the transducer may be reduced, thereby reducing the mass of the sound generation portion 11. It may be understood that although reducing the mass of the transducer may reduce the mass of a magnetic circuit component, thereby reducing the sound pressure output by the transducer, the wearing mode in which the sound generation portion 11 at least partially extends into the concha cavity or the wearing mode in which the sound generation portion 11 is at least partially disposed at the antihelix may increase the sound pressure in the ear canal to compensate for an impact of reducing the mass of the transducer on the sound pressure. Of course, too small mass of the sound generation portion 11 may result in an insufficient sound pressure output by the transducer. Therefore, in order to balance the wearing stability of the earphone 10 and the listening effect, in some embodiments, the mass of the sound generation portion 11 may be in a range of 3 g-6 g.

If a size of the sound generation portion 11 in the short axis direction Z and a size of the sound generation portion 11 in the long axis direction Y are too great, an opening of the ear canal may be blocked to a certain extent, and a communication between the opening of the ear canal and the external environment may not be realized, and an original intention of the design of the earphone 10 may be failed. On the basis of improving the sound output efficiency of the sound generation portion 11, the volume of the transducer may be reduced, thereby reducing the size of the sound generation portion 11. It may be understood that although reducing the size of the transducer may reduce the sound pressure output by the transducer, the wearing mode in which the sound generation portion 11 at least partially extends into the concha cavity or the wearing mode in which the sound generation portion 11 is at least partially disposed at the antihelix may enhance the sound pressure in the ear canal to compensate for an impact of reducing the mass of the transducer on the sound pressure. Of course, if the volume of the sound generation portion 11 is too small, the transducer may be unable to output sufficient sound pressure, especially, the transducer may not be able to generate sufficient sound pressure by pushing air in middle and low frequency ranges. In some embodiments, in order to take into account the communication between the opening of the ear canal and the external environment, as well as the listening effect, when the sound generation portion 11 is partially inserted into the concha cavity, the size of the sound generation portion 11 in the short axis direction Z may be in a range of 9 mm-18 mm, and the size of the sound generation portion 11 in the long axis direction Y may be in a range of 15 mm-35 mm. In some embodiments, the size of the sound generation portion 11 in the short axis direction Z may be in a range of 11 mm-16 mm, and the size of the sound generation portion 11 in the long axis direction Y may be in a range of 20 mm-31 mm. When the sound generation portion 11 is at least partially located at the antihelix, the size of the sound generation portion 11 in the short axis direction Z is in a range of 9 mm-18 mm, and the size of the sound generation portion 11 in the long axis direction Y is in a range of 16 mm-34 mm. In some embodiments, the size of the sound generation portion 11 in the short axis direction Z may be in a range of 12 mm-17 mm, and the size of the sound generation portion 11 in the long axis direction Y may be in a range of 17 mm-30 mm.

In some embodiments, the size of the sound generation portion 11 in the long axis direction Y may be obtained by performing the following operations. A short axis central plane of the magnetic circuit component may be obtained. The short axis central plane may be a plane that passes through a central axis of the magnetic circuit component and is perpendicular to the long axis direction Y of the sound generation portion 11. A section tangent to the end FE of the sound generation portion and parallel to the short axis central plane may be determined. A distance from the short axis central plane to the section may be regarded as half of the size of the sound generation portion 11 in the long axis direction Y. It should be noted that the size of the sound generation portion 11 in the short axis direction Z may be determined in a similar manner.

In some embodiments, a thickness of the sound generation portion 11 may affect a centroid position of the sound generation portion 11, and the centroid position of the sound generation portion 11 may affect the stability of wearing the earphone 10. For example, when the thickness of the sound generation portion 11 is too great, the centroid position of the sound generation portion 11 may move away from the ear, thereby affecting the fitting of the sound generation portion 11 and the concha cavity. On the basis of improving the sound output efficiency of the sound generation portion 11, the thickness of the transducer may be reduced, thereby reducing the thickness of the sound generation portion 11. It may be understood that although reducing the thickness of the transducer may reduce a magnetic field strength provided by the magnetic circuit component, thereby affecting the sound pressure output by the transducer, the wearing mode in which the sound generation portion 11 at least partially extends into the concha cavity or the wearing mode in which the sound generation portion 11 is at least partially disposed at the antihelix may enhance the sound pressure in the ear canal to compensate for an impact of reducing the mass of the transducer on the sound pressure. Of course, a too small thickness of the sound generation portion 11 may also lead to a too small thickness of the magnetic circuit component in the transducer, which cannot provide sufficient magnetic field strength. In addition, when the volume of the sound generation portion 11 is constant, increasing the thickness of the sound generation portion 11 may lead to a reduction in the size of the sound generation portion 11 in the long axis direction Y and/or the size of the sound generation portion 11 in the short axis direction Z, which in turn may result in a reduction on a size of a diaphragm of the transducer or a size of a voice coil of the transducer, thereby affecting the output sound pressure of the transducer. In some embodiments, in order to take into account both the wearing stability of the earphone 10 and the listening effect, the size of the sound generation portion 11 in the thickness direction may be in a range of 8 mm-17 mm.

In some embodiments, the size of the sound generation portion 11 in the thickness direction may also affect the size of the inside (e.g., the front cavity and the rear cavity) of the sound generation portion 11 in the thickness direction. For the front cavity, for example, increasing the size of the front cavity in the thickness direction may improve a resonant frequency of the front cavity. In order to make a resonant peak of the sound provided by the sound generation portion 11 to the ear canal at a position where the sound generation efficiency of the transducer is higher (e.g., at a frequency above 1000 Hz), so as to obtain a better listening effect, in some embodiments, the size of the sound generation portion 11 in the thickness direction may be in a range of 9 mm-14 mm.

In some embodiments, the volume of the sound generation portion 11 may be related to the volume of the transducer. If the volume of the sound generation portion 11 is relatively small, the volume of the transducer disposed inside the sound generation portion 11 may also be relatively small, resulting in a low efficiency in sound generation by pushing the air inside the housing of the sound generation portion 11 through the diaphragm of the transducer, which affects an acoustic output effect of the earphone 10, and then causes the sound pressure provided by the sound generation portion 11 to the ear canal to reduce. When the volume of the sound generation portion 11 is too great, the sound generation portion 11 may exceed the concha cavity, and cannot extend into the concha cavity to form the cavity-like structure, or a total size of a gap formed between the sound generation portion 11 and the concha cavity may be very large, which affects a sound leakage effect in the far field and a listening volume at the opening of the ear canal when the user wears the earphone 10. In some embodiments, the volume of the sound generation portion 11 may be in a range of 3500 $mm^3$-5200 $mm^3$.

In some embodiments, the volume of the sound generation portion 11 may be determined by multiplying a projection of the sound generation portion 11 on a reference plane (e.g., a sagittal plane of a human body) by the maximum size of the sound generation portion 11 in the thickness direction. Alternatively, considering that the sound generation portion 11 may have an irregular outer contour, the maximum sizes of the sound generation portion 11 in the long axis direction Y, the short axis direction X, and the thickness direction Z may be obtained respectively, and a first cuboid may be constructed based on the maximum sizes. In addition, a second cuboid may be constructed based on the minimum sizes of the sound generation portion 11 in the long axis direction Y, the short axis direction X, and the thickness direction Z, respectively. It may be understood that an actual volume of the sound generation portion may be smaller than the volume of the first cuboid, but greater than the volume of the second cuboid, and a range of the actual volume of the sound generation portion 11 may be determined by calculating the volume of the first cuboid and the volume of the second cuboid. For example, in some embodiments, if the volume of the first cuboid is 5500 $mm^3$ and the volume of the second cuboid is 2800 $mm^3$, it may be known that the volume of the sound generation portion 11 is a range of 2800 $mm^3$-5500 $mm^3$.

In some embodiments, a more accurate volume of the sound generation portion 11 may be obtained by a drainage method. Specifically, the openings of the sound generation portion 11 (e.g., the opening at a connection between the sound generation portion 11 and the earhook) may be sealed with a sealing material, so that a closed space may be formed inside, and then the sound generation portion 11 may be put into the water. The volume of the sound generation portion 11 may be determined based on a volume of water discharged (or in an approximate manner). It should be noted that, considering that the sealing material may have a certain volume, when the volume of the sound generation portion 11 is obtained by the drainage method, the measured volume value may be slightly reduced based on experience, so as to eliminate an interference of the sealing material on volume data.

In some embodiments, on the basis of improving the sound output efficiency of the sound generation portion 11, the volume of the sound generation portion 11 may be reduced. It may be understood that although reducing the volume of the sound generation portion 11 may reduce the sound pressure output by the transducer, the wearing mode in which the sound generation portion 11 at least partially extends into the concha cavity or the wearing mode in which the sound generation portion 11 is at least partially disposed at the antihelix may enhance the sound pressure in the ear canal to compensate for an impact of reducing the mass of the transducer on the sound pressure. In at least one frequency range, in order to enable the maximum sound pressure provided by the sound generation component 11 to the ear canal not smaller than 75 dB when the input voltage of the transducer is relatively small (e.g., not exceeding 0.6V), in some embodiments, the volume of the sound generation portion 11 may be in a range of 3300 $mm^3$-4800 $mm^3$.

A battery electrically connected to the sound generation portion 11 may be disposed in the battery compartment 13, and in some embodiments, the battery compartment 13 may be located at an end of the first portion 121 away from the sound generation portion 11. It should be noted that the mass of the battery compartment 13 is mainly the mass of the battery. In the present disclosure, "the mass of the battery compartment" refers to a sum of the mass of a compartment body of the battery compartment and the mass of the battery. As mentioned above, when the earphone 10 is worn, the battery compartment 13 and the sound generation portion 11 may form a lever-like structure with a certain position on the earhook as a fulcrum, so a too great or too small mass of the battery compartment 13 may lead to an instability of the lever-like structure, which in turn cause the earphone 10 to be worn unstable. Specifically, if the mass of the battery compartment 13 is too great, the earphone 10 may be inclined to the rear side of the auricle when worn, which affects a fit of the sound-generating portion 11 and the concha cavity. On the basis of improving the sound output efficiency of the sound generation portion 11, the output power of the battery may be reduced, thereby reducing the mass of the battery. It may be understood that although reducing the mass of the battery may reduce the output power of the battery, the wearing mode in which the sound generation portion 11 at least partially extends into the concha cavity may enhance the sound pressure in the ear canal to compensate for an impact of reducing the mass of the transducer on the sound pressure. Of course, if the mass of the battery compartment 13 is too small, the earphone 10 may be inclined to the front side of the auricle when worn, and the battery may not be able to drive the transducer. In some embodiments, in order to balance the wearing stability of the earphone 10 and the listening effect, the mass of the battery compartment 13 may be in a range of 1.2 g-3.1 g.

In some embodiments, the mass of the battery may be directly proportional to a charge of the battery. In some embodiments, the battery compartment 13 may be too small to affect the battery life of the earphone 10. As the maximum sound pressure that the sound generation portion is able to provide to the ear canal is not smaller than 75 dB when an input voltage or input power of the transducer is relatively small, that is to say, when the battery life is constant, the demands of the transducer for the charge of the battery is reduced. Therefore, in some embodiments, the mass of the battery may be reduced so that the mass of the battery compartment 13 may be in a range of 1.1 g-2.3 g.

The wearing mode in which the sound generation portion 11 is at least partially disposed at the antihelix may also increase the sound pressure in the ear canal, so as to compensate for the impact of reducing the mass of the transducer on the sound pressure. In some embodiments, when the sound generation portion 11 is at least partially disposed at the antihelix, the mass of the battery compartment 13 may be in a range of 1.1 g-3.0 g.

Based on the previous description about the masses of the sound generation portion 11 and the battery compartment 13, when the masses of the sound generation portion 11 and the battery compartment 13 are kept within a certain ratio range, the earphone 10 may have a good wearing feeling and listening effect. In some embodiments, when the sound generation portion 11 at least partially extends into the concha cavity, the ratio of the mass of the battery compartment 13 to the mass of the sound generation portion 11 may be in a range of 0.16-0.7. In some embodiments, the stable wearing of the earphone 10 may make a relative position of the sound hole 112 and the user's ear canal less likely to deviate, so that the sound generation portion 11 may provide a higher sound pressure to the user's ear canal. Therefore, in some embodiments, in order to further improve the wearing stability, the ratio of the mass of the battery compartment 13 to the mass of the sound generation portion 11 may be in a range of 0.2-0.6 when the sound generation portion 11 at least partially extends into the concha cavity.

Figure 11:
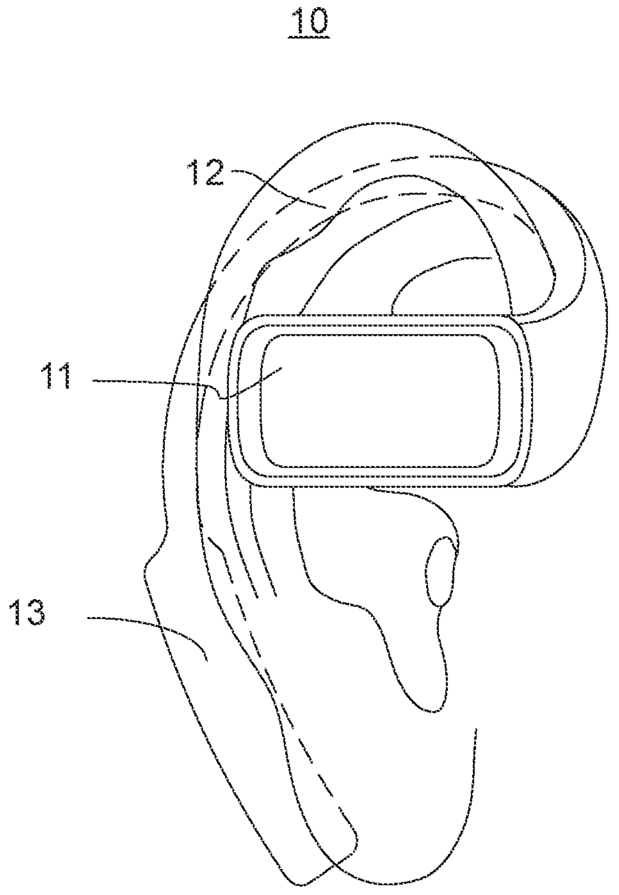
FIG. 11 is a schematic diagram illustrating an exemplary wearing of an earphone according to some embodiments of the present disclosure.

Referring to FIG. 11, in order to make the sound generation portion 11 of the earphone 10 at least partially located at the antihelix and have a good wearing feeling and listening effect, in some embodiments, the ratio of the mass of the battery compartment 13 to the mass of the sound generation portion 11 may be in a range of 0.15-0.66. In some embodiments, the stable wearing of the earphone 10 may make the relative position of the sound hole and the user's ear canal less likely to deviate, so that a baffle structure may be formed by the sound generation portion 11 and the auricle as shown in FIG. 5B, and the sound generation portion 11 may provide higher sound pressure to the user's ear canal. In some embodiments, in order to further improve the wearing stability, under the wearing mode in which the sound generation portion 11 is at least partially disposed at the antihelix, the ratio of the mass of the battery compartment 13 to the mass of the sound generation portion 11 may be in a range of 0.2-0.52.

The volume of the battery compartment 13 may be positively correlated with the volume of the battery. In some embodiments, in order to ensure the battery life of the earphone 10, the volume of the battery compartment 13 may be in a range of 850 $mm^3$-1900 $mm^3$ when the sound generation portion 11 at least partially extends into the concha cavity. In some embodiments, on the basis of improving the sound output efficiency of the sound generation portion 11, the demands of the transducer for the charge of the battery are reduced. Therefore, in the wearing mode in which the sound generation portion 11 at least partially extends into the concha cavity, the volume of the battery compartment 13 may be smaller, and the volume of the battery compartment 13 may be in a range of 750 $mm^3$-1600 $mm^3$.

In some embodiments, in order to ensure the battery life of the earphone 10, the volume of the battery compartment 13 may be in a range of 600 $mm^3$-2200 $mm^3$ when the sound generation portion 11 is at least partially located at the antihelix. The wearing mode in which the sound generation portion 11 at least partially extends into the concha cavity may also increase the sound pressure in the ear canal, thereby compensating for the impact of reducing the mass of the transducer on the sound pressure. Therefore, in some embodiments, under the wearing mode in which the sound generation portion 11 at least partially extends into the concha cavity, the volume of the battery compartment 13 may be in a range of 750 $mm^3$-2000 $mm^3$.

The basic concept has been described above, obviously, for those skilled in the art, the above detailed disclosure is only an example, and does not constitute a limitation to the present disclosure. Although not explicitly stated here, those skilled in the art may make various modifications, improvements and amendments to the present disclosure. These alterations, improvements, and modifications are intended to be suggested by the present disclosure, and are within the spirit and scope of the exemplary embodiments of the present disclosure.

The specific embodiments described in the present disclosure are only exemplary, and one or more technical features in the specific embodiments are optional or additional, and do not constitute essential technical features of the inventive concept of the present disclosure. In other words, the protection scope of the present disclosure covers and is far greater than the specific embodiments.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or features in the present disclosure of one or more embodiments may be appropriately combined.

Similarly, it should be appreciated that in the foregoing description of the embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Finally, it should be understood that the embodiments of the present disclosure are only used to illustrate the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An earphone, comprising:

a sound generation portion, including a transducer and a housing for accommodating the transducer; and an earhook including a first portion and a second portion, wherein the first portion is hung between an auricle and the head of a user, the second portion is connected to the first portion, extends toward an anterolateral side of the auricle, and is connected to the sound generation portion, the sound generation portion is fixed near an ear canal without blocking an opening of the ear canal, and in at least one frequency range, a sound generation efficiency of the sound generation portion is not small than 100 dB/V, the sound generation efficiency of the sound generation portion being a ratio of the sound pressure provided by the sound generation portion to the ear canal to an input voltage of the transducer.

2. The earphone of claim 1, wherein an input voltage of the transducer does not exceed 0.6V, a maximum sound pressure that the sound generation portion is able to provide to the ear canal is not smaller than 75 dB.

3. The earphone of claim 1, wherein in the at least one frequency range, the sound generation efficiency of the sound generation portion is in a range of 100~250 dB/V.

4. The earphone of claim 1, wherein the at least one frequency range includes 1000 Hz.

5. The earphone of claim 4, wherein at least a portion of the housing is inserted into a concha cavity, and a sound hole is disposed on an inner side of the housing facing the auricle.

6. The earphone of claim 5, wherein in the at least one frequency range, when the input voltage of the transducer does not exceed 0.4V, the maximum sound pressure that the sound generation portion is able to provide to the ear canal is not small than 72 dB.

7. The earphone of claim 5, wherein in the at least one frequency range, when an input current of the transducer does not exceed 35.3 mA, the maximum sound pressure that the sound generation portion is able to provide to the ear canal is not small than 75 dB.

8. The earphone of claim 5, wherein in the at least one frequency range, when an input power of the transducer does not exceed 21.1 mW, the maximum sound pressure that the sound generation portion is able to provide to the ear canal is not small than 75 dB.

9. The earphone of claim 5, wherein a size of the sound generation portion in a short axis direction is in a range of 11 mm~16 mm, a size of the sound generation portion in a long axis direction is in a range of 20 mm~31 mm, or a size of the sound generation portion in a thickness direction is in a range of 9 mm~14 mm.

10. The earphone of claim 5, wherein a volume of the sound generation portion is in a range of 3300 $mm^3$~4800 $mm^3$.

11. The earphone of claim 5, wherein an end of the first portion of the earhook away from the second portion includes a battery compartment, and a mass of the battery compartment is in a range of 1.1 g~2.3 g.

12. The earphone of claim 11, wherein a ratio of the mass of the battery compartment to the mass of the sound generation portion is in a range of 0.25-0.54.

13. The earphone of claim 11, wherein the volume of the battery compartment is in a range of 750 $mm^3$~1600 $mm^3$.

14. The earphone of claim 11, wherein a radial dimension of a cross-section of the battery compartment is in a range of 8 mm~12 mm.

15. The earphone of claim 4, wherein at least a portion of the housing is disposed at an antihelix, and a sound hole is disposed on an inner side of the housing facing the auricle.

16. The earphone of claim 15, wherein in the at least one frequency range, when the input voltage of the transducer does not exceed 0.6V, the maximum sound pressure that the sound generation portion is able to provide to the ear canal is not small than 70 dB.

17. The earphone of claim 15, wherein a size of the sound generation portion in a long axis direction is in a range of 16 mm~34 mm, or a size of the sound generation portion in a short axis direction is in a range of 7 mm~14 mm.

18. The earphone of claim 15, wherein an end of the first portion of the earhook away from the second portion includes a battery compartment, and the mass of the battery compartment is in a range of 1.1 g~3.0 g.

19. The earphone of claim 18, wherein a ratio of the mass of the battery compartment to the mass of the sound generation portion is in a range of 0.2-0.52.

20. The earphone of claim 15, wherein the volume of the battery compartment is in a range of 750 $mm^3$~2000 $mm^3$.

* * * * *